United States Patent
Tang et al.

(10) Patent No.: US 12,040,901 B2
(45) Date of Patent: Jul. 16, 2024

(54) INFORMATION PROCESSING DEVICE, INFORMATION PROCESSING METHOD, AND COMMUNICATION DEVICE TO REALIZE HIGH COMMUNICATION PERFORMANCE

(71) Applicant: SONY GROUP CORPORATION, Tokyo (JP)

(72) Inventors: Yifu Tang, Tokyo (JP); Hiromasa Uchiyama, Tokyo (JP); Naoki Kusashima, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 264 days.

(21) Appl. No.: 17/309,888

(22) PCT Filed: Nov. 20, 2019

(86) PCT No.: PCT/JP2019/045373
§ 371 (c)(1),
(2) Date: Jun. 28, 2021

(87) PCT Pub. No.: WO2020/144943
PCT Pub. Date: Jul. 16, 2020

(65) Prior Publication Data
US 2022/0045798 A1    Feb. 10, 2022

(30) Foreign Application Priority Data
Jan. 10, 2019 (JP) .................................. 2019-002942

(51) Int. Cl.
*H04L 1/1812* (2023.01)
*H04L 5/00* (2006.01)
(Continued)

(52) U.S. Cl.
CPC .......... *H04L 1/1812* (2013.01); *H04L 5/0053* (2013.01); *H04W 4/40* (2018.02); *H04W 92/18* (2013.01)

(58) Field of Classification Search
CPC ....... H04W 4/40; H04W 92/18; H04W 76/40; H04W 4/021; H04W 4/023; H04W 4/06;
(Continued)

(56) References Cited

U.S. PATENT DOCUMENTS

2014/0321293 A1* 10/2014 Hwang ................. H04L 1/1692
  370/242
2015/0319746 A1* 11/2015 Lu ......................... H04L 1/1812
  370/280

(Continued)

FOREIGN PATENT DOCUMENTS

| CN | 108605253 A | 9/2018 |
|----|-------------|--------|
| EP | 2795977     | 10/2015 |

(Continued)

OTHER PUBLICATIONS

"HARQ feedback optimization techniques for improved reliability in Cellular Vehicle to Everything"; Leibel et al.; 2020 International Wireless Communications and Mobile Computing (IWCMC); Jun. 15-19, 2020 (Year: 2020).*

(Continued)

*Primary Examiner* — Benjamin H Elliott, IV
(74) *Attorney, Agent, or Firm* — CHIP LAW GROUP

(57) ABSTRACT

An information processing device includes an acquisition unit that acquires information about sidelink communication, and a determination unit that determines whether to enable feedback related to a data automatic repeat request in the sidelink communication based on the information about the sidelink communication.

21 Claims, 22 Drawing Sheets

(51) Int. Cl.
*H04W 4/40* (2018.01)
*H04W 92/18* (2009.01)

(58) Field of Classification Search
CPC ...... H04W 4/46; H04L 1/1812; H04L 5/0053; H04L 1/1825; H04L 2001/0095; H04L 2001/0097; H04L 1/1896; H04L 1/1864
See application file for complete search history.

(56) References Cited

U.S. PATENT DOCUMENTS

| | | | |
|---|---|---|---|
| 2016/0219620 A1 | 7/2016 | Lee | |
| 2016/0241411 A1 | 8/2016 | Huang et al. | |
| 2017/0215183 A1* | 7/2017 | Gulati | H04L 1/1896 |
| 2018/0091265 A1* | 3/2018 | Liu | H04L 1/08 |
| 2019/0319723 A1* | 10/2019 | Axmon | H04B 17/309 |
| 2020/0099476 A1* | 3/2020 | Park | H04W 4/70 |
| 2020/0178039 A1* | 6/2020 | Lee | H04W 4/029 |
| 2020/0351032 A1* | 11/2020 | Wu | H04W 72/20 |
| 2022/0045798 A1* | 2/2022 | Tang | H04L 5/0053 |

FOREIGN PATENT DOCUMENTS

| | | |
|---|---|---|
| EP | 3031242 A1 | 6/2016 |
| JP | 2017-208796 A | 11/2017 |
| TW | 201838444 A | 10/2018 |
| WO | 2015/017983 A1 | 2/2015 |
| WO | WO-2017196085 A2 | 11/2017 |
| WO | 2018/171540 A1 | 9/2018 |

OTHER PUBLICATIONS

"Cellular-V2X Communications for Platooning: Design and Evaluation"; Nardini et al.; Sensors 2018, 18, 1527doi:10.3390/s18051527; May 11, 2018 (Year: 2018).*

English translation of KR 2020-0034923 (published Apr. 1, 2020), published application of KR 2019-0082956, claiming benefit to KR 2018-0114042 A (Sep. 21, 2018) and KR 2018-0133120 A (Nov. 1, 2018); retrieved from the internet Sep. 8, 2023 (Year: 2023).*

English translation of international search report (ISR) of PCT/JP2019/045373; dated Feb. 18, 2020 (Year: 2020).*

"Final Report of 3GPP TSG RAN WG1 #95 v1.0.0"; MCC Support; 3GPP TSG RAN WG1 Meeting #96 R1-1901482 Athens, Greece, Feb. 25-Mar. 1, 2019 (Year: 2019).*

"Feature lead summary for agenda item 7.2.4.1.2 Physical layer structures and procedure(s)"; LG Electronics; 3GPP TSG RAN WG1 Meeting #94bis R1-1811835 Chengdu, China, Oct. 8-12, 2018 (Year: 2018).*

"Discussion on physical layer procedure", MediaTek Inc, 3GPP TSG RAN WG1, 95 Meeting, Spokane, USA, R1-1812365, Nov. 12-16, 2018, 06 pages.

"Physical layer procedures for HARQ operation for groupcast and unicast transmissions", Qualcomm Incorporated, 3GPP TSG RAN WG1, 95 Meeting, Spokane, USA, RI-1813422, Nov. 12-16, 2018, 06 pages.

"Discussion on HARQ feedback and CSI acquisition in NR Sidelink", Sharp, 3GPP TSG RAN WG1, 95 Meeting, R1-1813210, Spokane, USA, Nov. 12-16, 2018, 03 pages.

"Physical layer procedure for NR-V2X", OPPO, 3GPP TSG RAN WG1, 95 Meeting, Spokane, USA, R1-1812811, Nov. 12-16, 2018, 05 pages.

Extended European Search Report of EP Application No. 19908727.1, dated Feb. 3, 2022, 15 pages.

"Physical layer procedures for HARQ operation for groupcast and unicast transmissions", Qualcomm Incorporated, 3GPP TSG RAN WG1, 95th Meeting, R1-1813422, Spokane, USA, Nov. 12-16, 2018, 06 pages.

International Search Report and Written Opinion of PCT Application No. PCT/JP2019/045373, dated Feb. 18, 2020, 09 pages of ISRWO.

"Physical Layer Procedures for Unicast and Groupcast", Fraunhofer HHI, Fraunhofer IIS, 3GPP TSG RAN WG1 96th Meeting, R1-1901843, Athens, Greece, Feb. 25-Mar. 1, 2019, 07 pages.

"Discussion on physical layer procedure", MediaTek Inc., 3GPP TSG RAN WG1, 95th Meeting, R1-1812365, Spokane, USA, Nov. 12-16, 2018, 06 pages.

"On Physical Layer Procedures", InterDigital Inc., 3GPP TSG RAN WG1, 95th Meeting, R1-1813227, Spokane, USA, Nov. 12-16, 2018, 05 pages.

"Discussion on HARQ feedback and CSI acquisition in NR Sidelink", Sharp, 3GPP TSG RAN WG1, 95th Meeting, R1-1813210, Spokane, USA, Nov. 12-16, 2018, 03 pages.

"Physical layer procedure for NR-V2X", OPPO, 3GPP TSG RAN WG1, 95th Meeting, R1-1812811, Spokane, USA, Nov. 12-16, 2018, pp. 05.

Extended European Search Report of EP Application No. 23220047.7, issued on Apr. 25, 2024, 08 pages.

* cited by examiner

INFORMATION PROCESSING DEVICE, INFORMATION PROCESSING METHOD, AND COMMUNICATION DEVICE TO REALIZE HIGH COMMUNICATION PERFORMANCE

CROSS REFERENCE TO RELATED APPLICATIONS

This application is a U.S. National Phase of International Patent Application No. PCT/JP2019/045373 filed on Nov. 20, 2019, which claims priority benefit of Japanese Patent Application No. JP 2019-002942 filed in the Japan Patent Office on Jan. 10, 2019. Each of the above-referenced applications is hereby incorporated herein by reference in its entirety.

FIELD

The present disclosure relates to an information processing device, an information processing method, and a communication device.

BACKGROUND

Conventionally, an Automatic Repeat reQuest (ARQ) is known as a technique for automatically retransmitting data when an error occurs in the communication path. In recent years, in radio communication, a hybrid ARQ (HARQ), which is an advanced version of the ARQ, has begun to be used in order to efficiently use radio resources.

CITATION LIST

Patent Literature

Patent Literature 1: JP 2017-208796 A

SUMMARY

Technical Problem

However, in radio communication, in addition to the requirement for efficient use of radio resources, there is a requirement for communication performance (for example, communication reliability and/or delay, and the like). When an automatic repeat technology such as the HARQ is simply used for radio communication, the communication performance may deteriorate depending on the communication aspect such as the use case of radio communication and the communication environment of radio communication.

Therefore, the present disclosure offers an information processing device, an information processing method, and a communication device capable of realizing high communication performance.

Solution to Problem

To solve the above problem, an information processing device according to the present disclosure includes: an acquisition unit that acquires information about sidelink communication; and a determination unit that determines whether to enable feedback related to an automatic repeat request of data in the sidelink communication based on the information about the sidelink communication.

DESCRIPTION OF EMBODIMENTS

Figure 1:
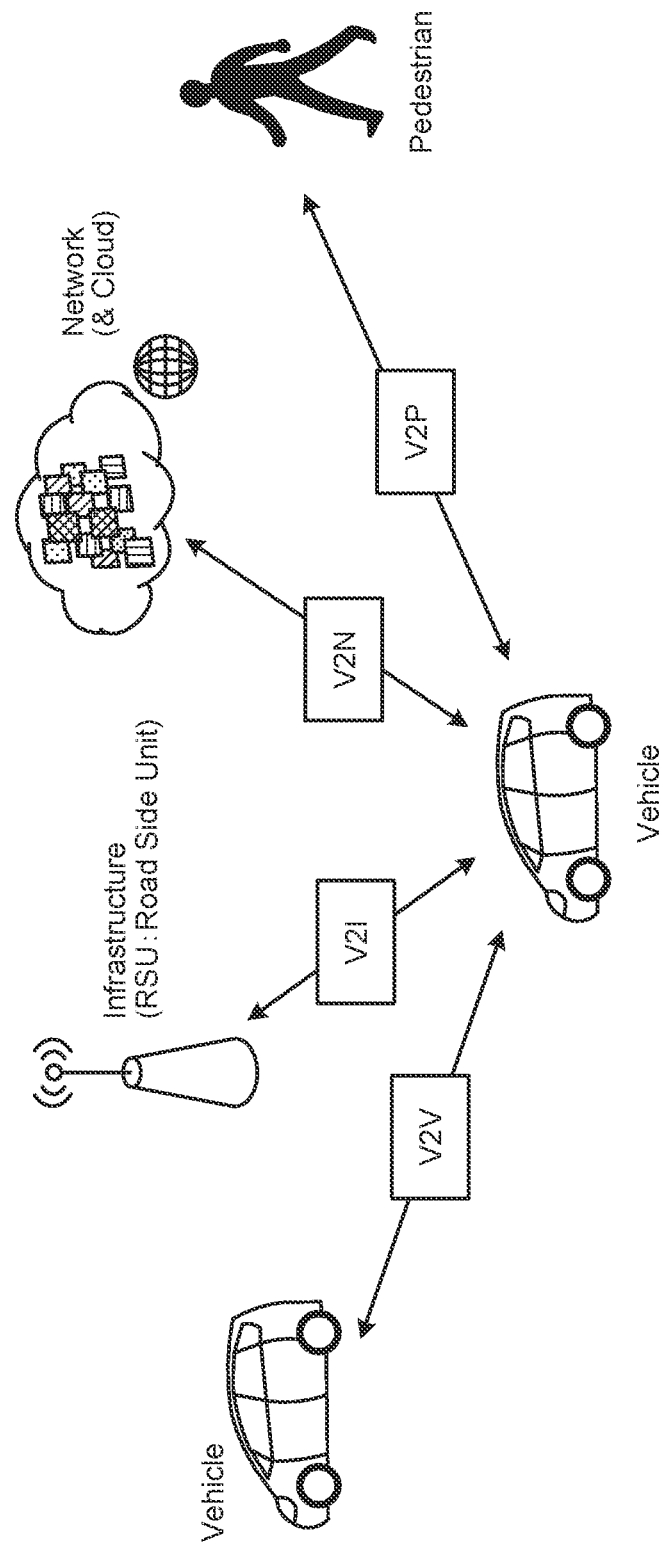
FIG. 1 is a diagram for explaining V2X communication.

Hereinafter, the embodiments of the present disclosure will be described in detail with reference to the drawings. In the following embodiments, the same parts are designated by the same reference numerals, so that duplicate description will be omitted.

Further, in the present specification and drawings, a plurality of components having substantially the same functional configurations may be distinguished by adding different numbers after the same reference numerals. For example, a plurality of configurations having substantially the same functional configuration is distinguished as required by base station devices 201 and 202. However, when it is not necessary to distinguish each of the plurality of components having substantially the same functional configurations, only the same reference numerals are given. For example, when it is not necessary to distinguish between the base station devices 201 and 202, they are simply referred to as the base station device 20.

Further, the present disclosure will be described in the following item order.

1. Introduction
1-1. Overview of V2X communication
1-2. V2X use case
1-3. Physical layer enhancement
1-4. V2X operation scenario
1-5. Outline of the present embodiment
2. Information processing system configuration
2-1. Overall configuration of information processing system
2-2. Configuration of management device
2-3. Configuration of base station device (Network)
2-4. Configuration of base station device (Infrastructure)
2-5. Configuration of terminal device
2-6. Configuration of mobile device
3. Operation of information processing system
3-1. Determination process of enabling/disabling of HARQ feedback
3-2. Execution entity of determination process
3-3. Information used for determination
3-4. Notification of determination result
3-5. Execution of sidelink communication after determination
3-6. HARQ feedback mode
4. Modification
4-1. Modification regarding HARQ feedback
4-2. Other modifications
5. Conclusion

1. INTRODUCTION

Conventionally, mobile communication systems have provided communication functions for mobile terminals such as mobile phones and smartphones. However, in recent years, it has become important for mobile communication systems to support communication for mobile units of a type different from mobile terminals, such as automobiles, drones, and robots.

For example, in recent years, mobile communication systems are required to support a vehicle-to-everything (V2X) communication as communication for automobiles. Examples of communication for automobiles include road-to-vehicle communication realized by an intelligent transportation system (ITS) and the like, and vehicle-to-vehicle communication realized by sidelink communication and the like. This communication technology has the potential to become important technology for the realization of autonomous driving in the future.

Here, V2X communication is communication between a vehicle and "something". FIG. 1 is a diagram for explaining V2X communication. Here, examples of "something" include a vehicle, an infrastructure, a network, a pedestrian, and the like. Communication between the vehicles is referred to as vehicle-to-vehicle (V2V) communication. Communication between the vehicle and the infrastructure is referred to as vehicle-to-infrastructure (V2I) communication. Communication between the vehicle and the network is referred to as vehicle-to-network (V2N) communication. Communication between the vehicle and the pedestrian is referred to as vehicle-to-pedestrian (V2P) communication.

<1-1. Overview of V2X Communication>

Figure 2:
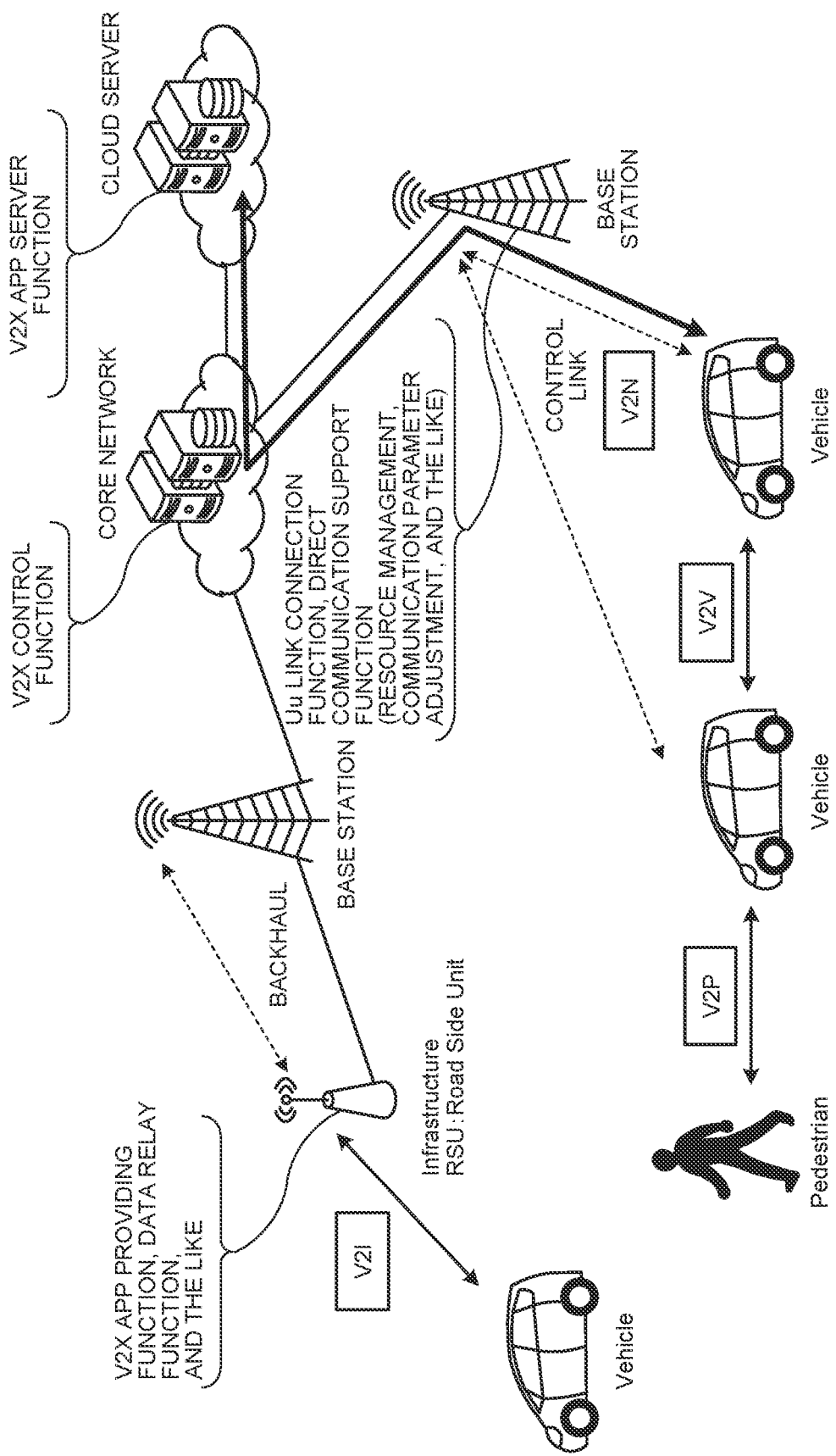
FIG. 2 is a diagram illustrating an example of an overall image of V2X communication.

FIG. 2 is a diagram illustrating an example of an overall image of V2X communication. In the example illustrated in FIG. 2, the cloud server has an APP server (Application Server) function of the V2X. The cloud server is connected to the core network via a network such as the Internet. The core network is composed of devices having a control function of the V2X communication. A plurality of base stations is connected to the core network. The base station has a function (for example, a Uu link connection function using a Uu interface) of radio communicating with a terminal device (vehicle in the example of FIG. 2). In addition, the base station has a function of supporting direct communication (for example, sidelink communication) such as the V2V communication and the V2P communication. A road side unit (RSU) is disposed on the road as an infrastructure. There are two possible RSUs, a base station type RSU and a UE type RSU. The RSU has, for example, an APP providing function and a data relay function of the V2X.

<1-2. V2X Use Case>

For radio communication for automobiles, so far, the development of 802.11p-based dedicated short range communication (DSRC) has been mainly promoted. However, in recent years, the "LTE-based V2X", which is an in-vehicle communication based on a long term evolution (LTE), has been standardized. In the LTE-based V2X communication, the exchange of basic safety messages etc. is supported. In recent years, the NR V2X communication using 5G technology (NR: New Radio) has been studied with the aim of further improving the V2X communication.

Figure 3:
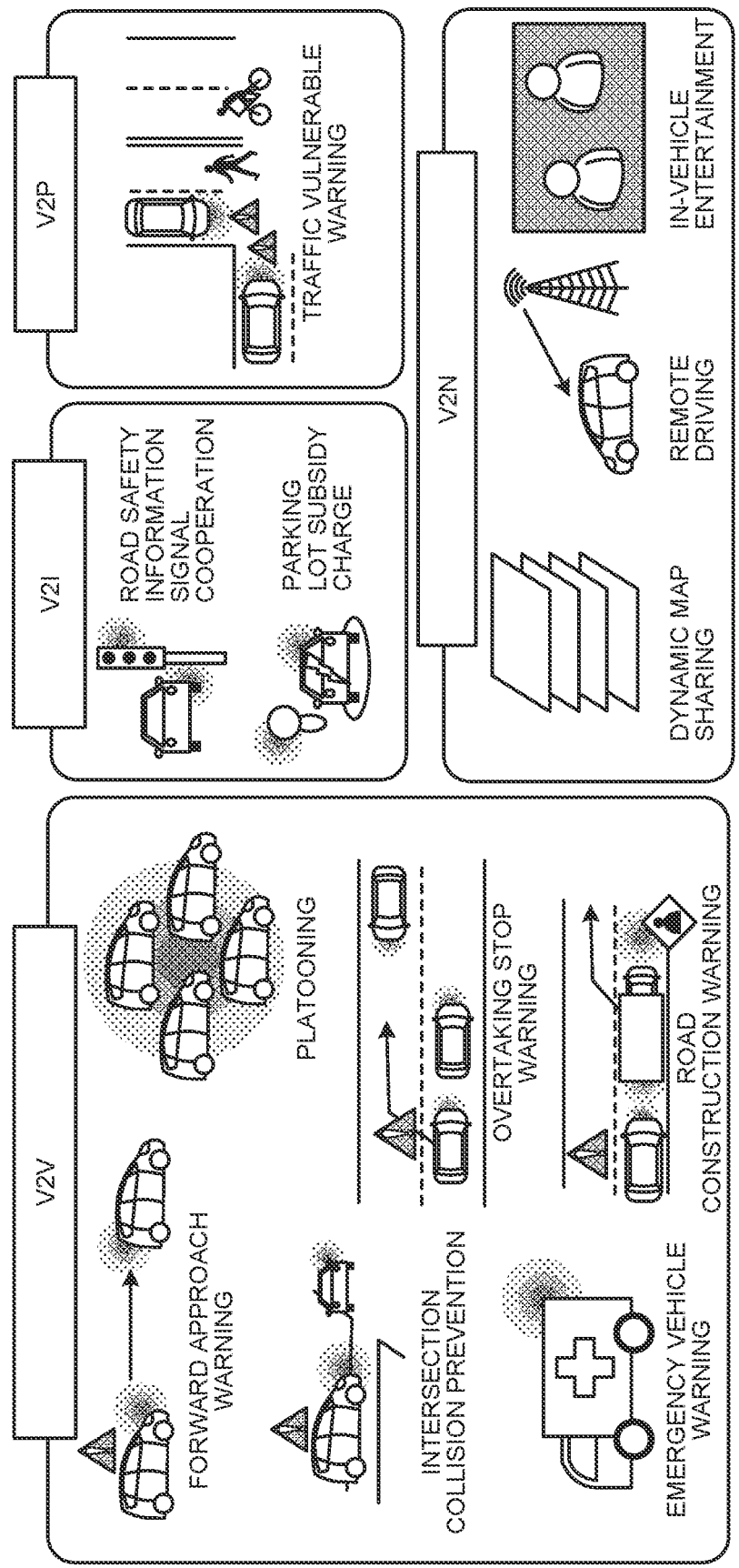
FIG. 3 is a diagram illustrating an example of a use case of V2X communication.

FIG. 3 is a diagram illustrating an example of a use case of the V2X communication. Examples of the use case of the V2V communication include forward approach warning, intersection collision prevention, emergency vehicle warning, platooning, overtaking stop warning, road construction warning, and the like. In addition, examples of the use case of the V2I communication include notification of road safety information, traffic light cooperation, parking lot assistance, billing, and the like. In addition, examples of the use case of the V2P communication include warnings for traffic vulnerable people and the like. Examples of the use case of the V2N communication include dynamic link sharing, remote driving, and in-house entertainment.

The NR V2X communication supports a new use case that requires high reliability, low delay, high-speed communication, and high capacity, which the LTE-based V2X could not support before. Examples of FIG. 3 include provision of a dynamic map, remote driving, and the like. In addition to this, the examples include a sensor data sharing in which sensor data is exchanged between vehicles and a road and a vehicle, and a platooning use case for platooning. The use cases and requirements for the NR V2X communication are described in 3GPP TR22.886, and the like. The following (1) to (4) are brief explanations of some use cases.

(1) Vehicles Platooning

An example of the use case of the NR V2X communication includes platooning. The platooning means that a plurality of vehicles forms a platoon and travels in the same direction. Information that controls platooning is exchanged between the vehicle leading the platooning and other vehicles. The NR V2X communication is used to exchange this information. By exchanging the information using the NR V2X communication, it is possible to further reduce the inter-vehicle distance for platooning.

(2) Extended Sensors

An example of the use case the NR V2X communication includes the exchange of sensor-related information (raw data before data processing and processed data). The sensor information is collected through local sensors, live video images between surrounding vehicles, RSUs and pedestrians, V2X application servers, and the like. By exchanging these pieces of information, the vehicle can acquire information that cannot be obtained by its own sensor information, and can recognize/understand a wider range of environments. In this use case, a lot of pieces of information is required to be exchanged, so that high data rate is required for communication.

(3) Advanced Driving

Examples of the use case of the NR V2X communication include semi-autonomous driving and fully autonomous driving. The RSU shares the recognition/understanding information obtained from its own sensor and the like to surrounding vehicles. As a result, each vehicle can adjust the trajectory and operation of the vehicle in synchronization and coordination. By using the NR V2X communication, each vehicle can also share the purpose and intention of driving with surrounding vehicles.

(4) Remote Driving

An example of the use case of the NR V2X communication includes remote control by remote control and V2X applications. The remote control is used, for example, for people who cannot drive or in dangerous areas. The cloud computing-based maneuver can also be used for public transport, where routes and roads are fixed to some extent. In this use case, high reliability and low transmission delay are required for communication.

The use cases illustrated above are just examples. The use case of the V2X communication of the present embodiment may be a use case other than these.

<1-3. Physical Layer Enhancement>

Further enhancement of the physical layer from the LTE V2X will be required to achieve the above requirements. Examples of the target link include a Uu link, which is a link between infrastructure such as a base station and an RSU, and a terminal, and a PC5 link (sidelink), which is a link between terminals. The following (1) to (9) are examples of major enhancements.

(1) Channel format
(2) Sidelink feedback communication
(3) Sidelink resource allocation method
(4) Vehicle position information estimation technology
(5) Relay communication between terminals
(6) Support for unicast communication and multicast communication
(7) Multi-carrier communication, carrier aggregation
(8) MIMO/beamforming
(9) Radio frequency support (example: 6 GHz or higher)

Examples of channel format enhancement in (1) include flexible numerology, short transmission time interval (TTI), multi-antenna support, Waveform, and the like. In addition, examples of the enhancement of sidelink feedback communication in (2) include HARQ, channel status information (CSI), and the like.

<1-4. V2X Operation Scenario>

Next, an example of the V2X communication operation scenario will be described. In the V2N communication, communication between the base station and the terminal is simple with only DL/UL communication, but in the V2V communication, various communication paths can be considered. In the following explanation, each scenario will be explained using an example of the V2V communication, but the same communication operation can be applied to the V2P and the V2I. In this case, the communication destination is not a vehicle, but a pedestrian or an RSU.

(1) Scenario 1

Figure 4:
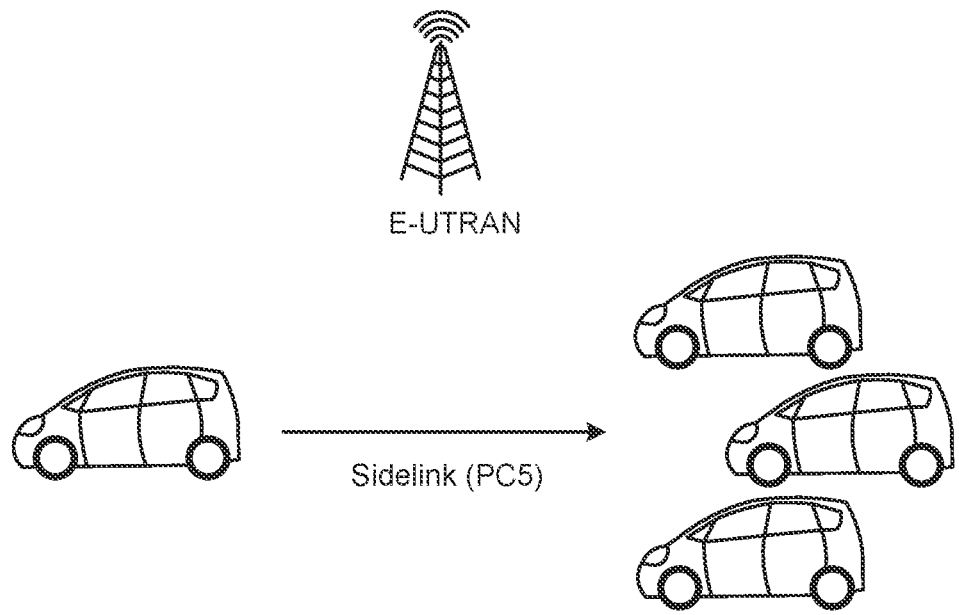
FIG. 4 is an example of V2V communication according to scenario 1.

FIG. 4 is an example of the V2V communication according to the scenario 1. In the scenario 1, a vehicle communicates directly with a vehicle using the sidelink communication. The sidelink is a communication link between terminals such as the PC5. In addition to the PC5, the sidelink is sometimes referred to as a V2V communication link, a V2P communication link, a V2I communication link, or the like. In the example of FIG. 4, a vehicle communicates directly with a vehicle using the sidelink communication without through the radio access network. In the example of FIG. 4, an evolved universal terrestrial radio access network (E-UTRAN) is illustrated as a radio access network, but the radio access network is not limited to the E-UTRAN.

(2) Scenario 2

Figure 5:
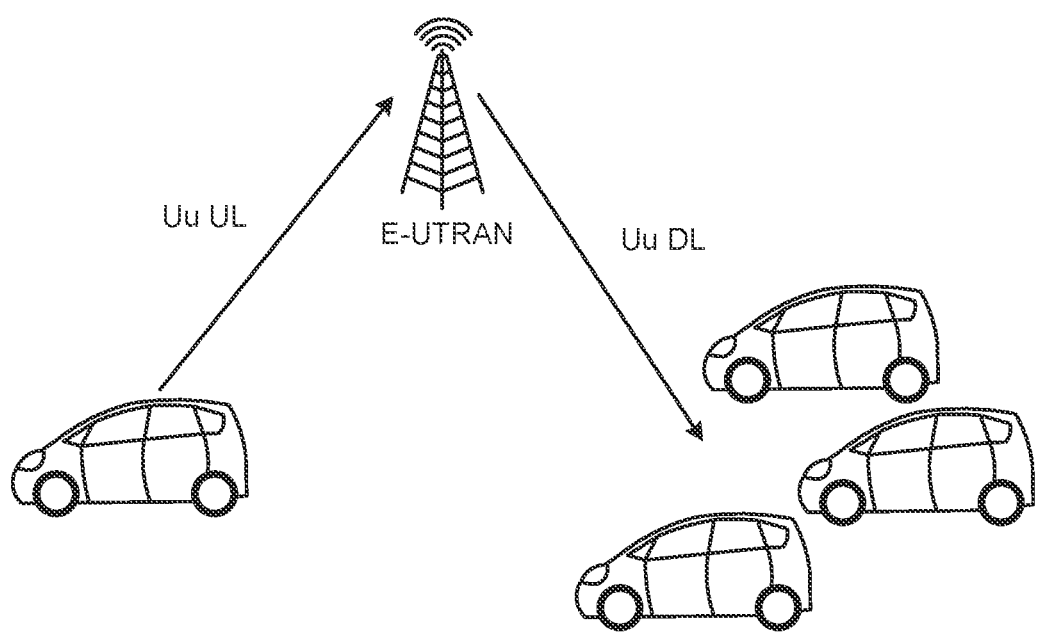
FIG. 5 is an example of V2V communication according to scenario 2.

FIG. 5 illustrates an example of the V2V communication according to the scenario 2. In the scenario 2, a vehicle communicates with a vehicle through the radio access network. In the example of FIG. 5, data is transmitted from one vehicle to a plurality of vehicles. In FIG. 5, the Uu indicates a Uu interface. The Uu interface is a wireless interface between a terminal and a base station. UL indicates uplink and the DL indicates downlink. In the example of FIG. 5, the E-UTRAN is illustrated as a radio access network, but the radio access network is not limited to the E-UTRAN.

(3) Scenario 3

Figure 6:
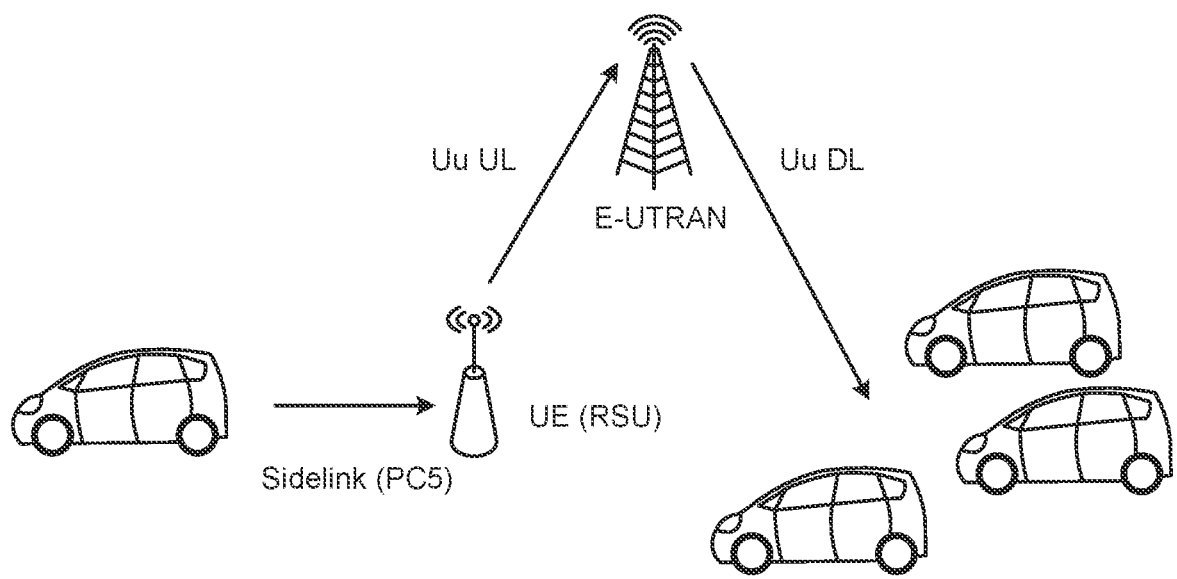
FIG. 6 is an example of V2V communication according to scenario 3.

FIG. 6 is an example of the V2V communication according to the scenario 3. In the scenario 3, a vehicle communicates with a vehicle through the RSU and the radio access network. In the example of FIG. 6, data is transmitted from one vehicle to a plurality of vehicles. In the example of FIG. 6, one vehicle and the RSU are connected via sidelink communication. In the example of FIG. 6, the E-UTRAN is illustrated as a radio access network, but the radio access network is not limited to the E-UTRAN.

(4) Scenario 4

Figure 7:
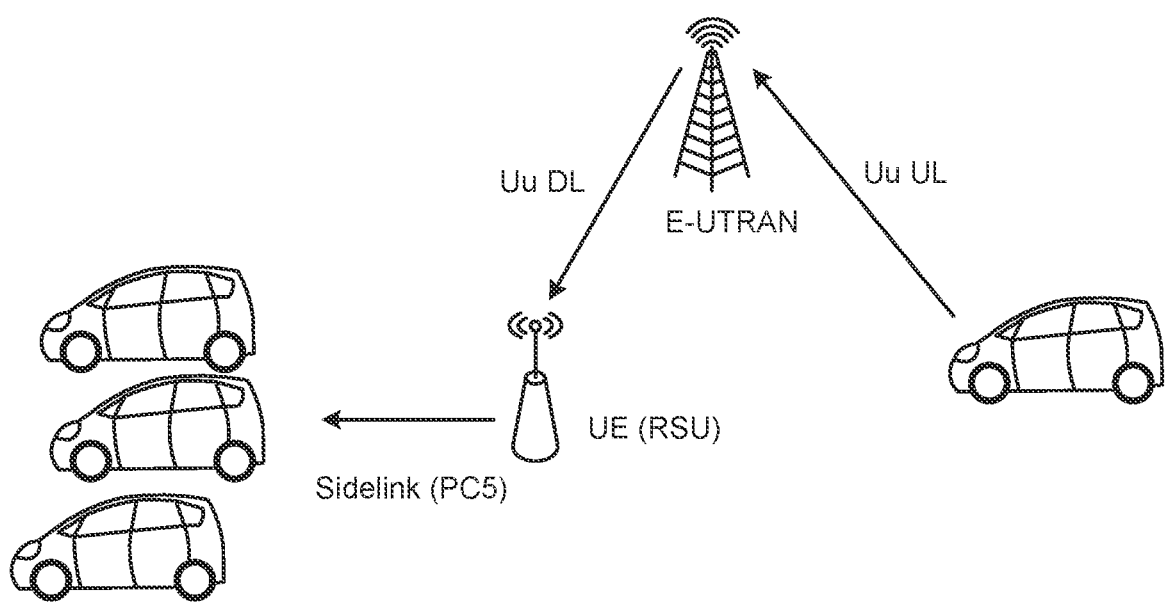
FIG. 7 is an example of V2V communication according to scenario 4.

FIG. 7 illustrates an example of the V2V communication according to the scenario 4. In the scenario 4, a vehicle communicates with a vehicle through the RSU and the radio access network. In the example of FIG. 7, a plurality of vehicles and the RSU are connected via sidelink communication. In the example of FIG. 7, the E-UTRAN is illustrated as a radio access network, but the radio access network is not limited to the E-UTRAN.

(5) Scenario 5

Figure 8:
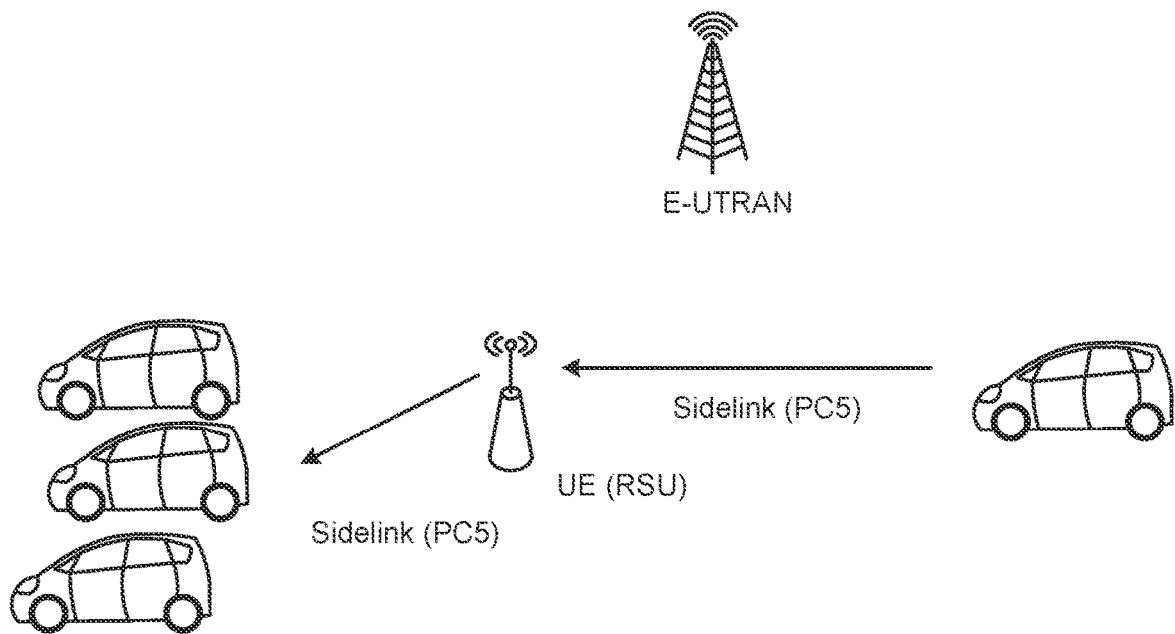
FIG. 8 is an example of V2V communication according to scenario 5.

FIG. 8 illustrates an example of the V2V communication according to the scenario 5. In the scenario 5, a vehicle communicates with a vehicle through the RSU, without through the radio access network. The RSU illustrated in FIG. 8 is a fixed station type RSU.

(6) Scenario 6

Figure 9:
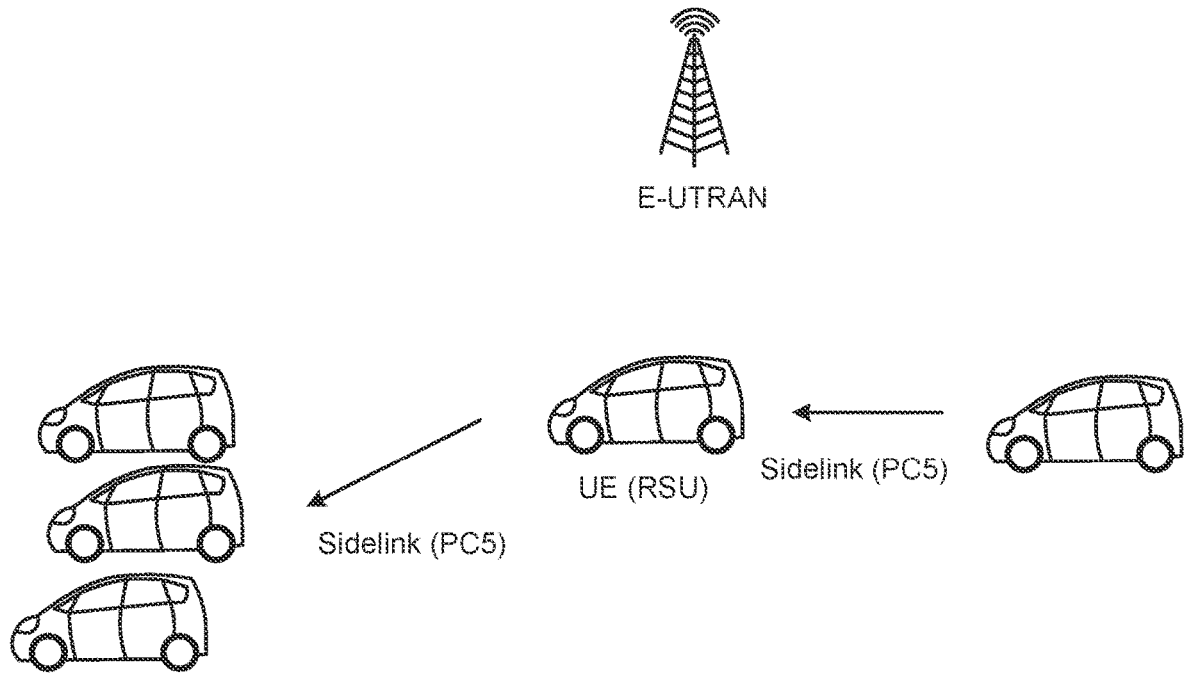
FIG. 9 is an example of V2V communication according to scenario 6.

FIG. 9 illustrates an example of the V2V communication according to the scenario 6. In the scenario 6, a vehicle communicates with a vehicle through the RSU, without through the radio access network. The RSU illustrated in FIG. 9 is a mobile station type RSU.

<1-5. Outline of the Present Embodiment>

In the conventional V2X communication, the broadcast has been adopted for sidelink communication. In this case, since the transmission terminal cannot obtain feedback from the reception terminal, the reliability is improved by performing repeated transmission up to twice from the beginning. However, communication using such repeated transmission has two drawbacks.

The first is that the repeated transmissions use more radio resources. In other words, resource utilization efficiency is not very good. The second is that even when the transmission is repeated, it cannot be confirmed whether the transmitted packet has reached the sender after all. In other words, it is difficult to guarantee the reliability of communication. The NR V2X communication requires more severe low delay and high reliability than the LTE V2X. Therefore, it is not desirable to repeat transmission like the LTE V2X.

On the other hand, in the NR V2X communication, in addition to the broadcast, a unicast and a multicast are supported. The unicast and the multicast, unlike the broadcast, target specific recipients for data transmission. Therefore, the sender terminal can easily obtain feedback from the receiver terminal. Therefore, in the NR V2X communication, to improve the efficiency of the radio resource and the reliability of the sidelink communication in a unicast and a multicast, the HARQ feedback is introduced. However, the transmission of the HARQ feedback has the following problems (1) to (7), for example.

(1) The transmission of the HARQ feedback may collide with another data transmission/reception.

(2) When the data transmitter receives the HARQ feedback of the data receiver, the data transmitter retransmits the data to the data receiver when the HARQ feedback is a NACK. In this case, since it takes time to for the HARQ feedback and retransmission, it may not be possible to satisfy the low delay request for sidelink communication (hereinafter referred to as a delay request).

(3) It is difficult to the secure resource for the HARQ feedback during congestion.

(4) Since the data receiver transmits the HARQ feedback, it is impossible to transmit and receive its own data at the timing of transmitting the HARQ feedback.

(5) Since the data transmitter receives the HARQ feedback, it is impossible to transmit and receive its own data at the timing of receiving the HARQ feedback.

(6) In the multicast (also referred to as group cast), when the data transmitter retransmits the data until all the data receivers have received the data, many radio resources are used for the retransmission.

(7) In the multicast, when the group members of the multicast change frequently, it is difficult to perform retransmission by the HARQ feedback.

That is, when the data receiver is configured to constantly transmit the HARQ feedback to the data transmitter, the communication performance may deteriorate depending on the communication aspect. Therefore, in the present embodiment, the inventors propose a mechanism for enabling or disabling the HARQ feedback from the data receiver according to the communication aspect.

For example, the information processing device of the present embodiment acquires information about sidelink communication (for example, information indicating the degree of congestion of communication). The information processing device is, for example, a base station device or a communication device of the data transmitter. Then, the information processing device determines whether to enable the HARQ feedback in the sidelink communication based on the information about the sidelink communication.

As a result, the HARQ feedback of the communication device of the receiver is enabled or disabled depending on the communication aspect (for example, communication congestion status), so that high communication performance is achieved in the sidelink communication.

2. INFORMATION PROCESSING SYSTEM CONFIGURATION

Hereinafter, an information processing system 1 according to the embodiment of the present disclosure will be described. The information processing system 1 is a mobile communication system including a plurality of communication devices (mobile device, terminal device) capable of performing sidelink communication. The communication device can use the HARQ in the sidelink communication.

The information processing system 1 is a radio communication system using predetermined radio access technology (RAT). For example, the information processing system 1 is a cellular communication system using the radio access technology such as a wideband code division multiple access (W-CDMA), a code division multiple access 2000 (cdma2000), a long term evolution (LTE), and a new radio (NR). At this time, the cellular communication system is not limited to the mobile phone communication system, and may be, for example, intelligent transport systems (ITS). The information processing system 1 is not limited to the cellular communication system, and may be, for example, other radio communication systems such as a radio local area network (LAN) system, an aeronautical radio system, and a space radio communication system.

The information processing system 1 provides an application processing execution function (for example, edge function) to the mobile device through a radio network that uses the radio access technology such as an LTE and an NR. The LTE and the NR are a type of the cellular communication technology, and enable mobile communication of a mobile device by disposing a plurality of areas covered by the base station device in a cell manner.

In the following explanation, the "LTE" includes an LTE-Advanced (LTE-A), an LTE-Advanced Pro (LTE-A Pro), and an evolved universal terrestrial radio access (EUTRA). In addition, the NR includes a new radio access technology (NRAT) and a further EUTRA (FEUTRA). A single base station may manage a plurality of cells. The cell that supports the LTE is sometimes referred to as an LTE cell. In addition, a cell that supports the NR is sometimes referred to as an NR cell.

The NR is the next generation (fifth generation) of LTE radio access technology (RAT). The NR is a radio access technology that can support various use cases including an enhanced mobile broadband (eMBB), massive machine type communications (mMTC), and ultra-reliable and low latency communications (URLLC). The NR is being studied aiming at a technical framework that supports a usage scenarios, requirements, and deployment scenarios in these use cases.

The LTE base station may be referred to as an evolved node B (eNodeB) or an eNB. Also, the NR base stations may be referred to as a gNodeB or a gNB. In the LTE and the NR, the mobile device may be referred to as a user equipment (UE).

<2-1. Overall Configuration of Information Processing System>

Figure 10:
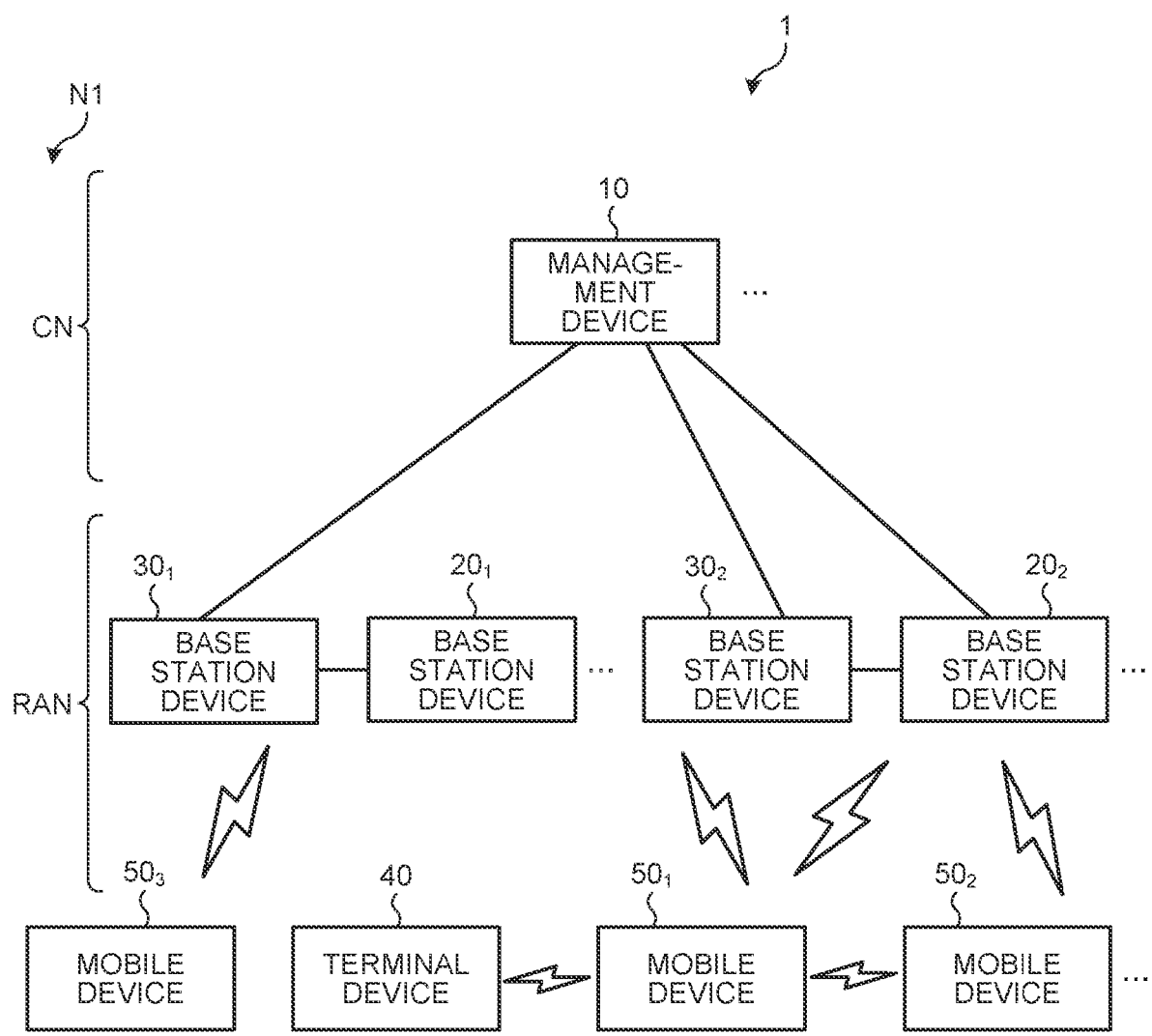
FIG. 10 is a diagram illustrating a configuration example of an information processing system 1 according to an embodiment of the present disclosure.
Figure 11:
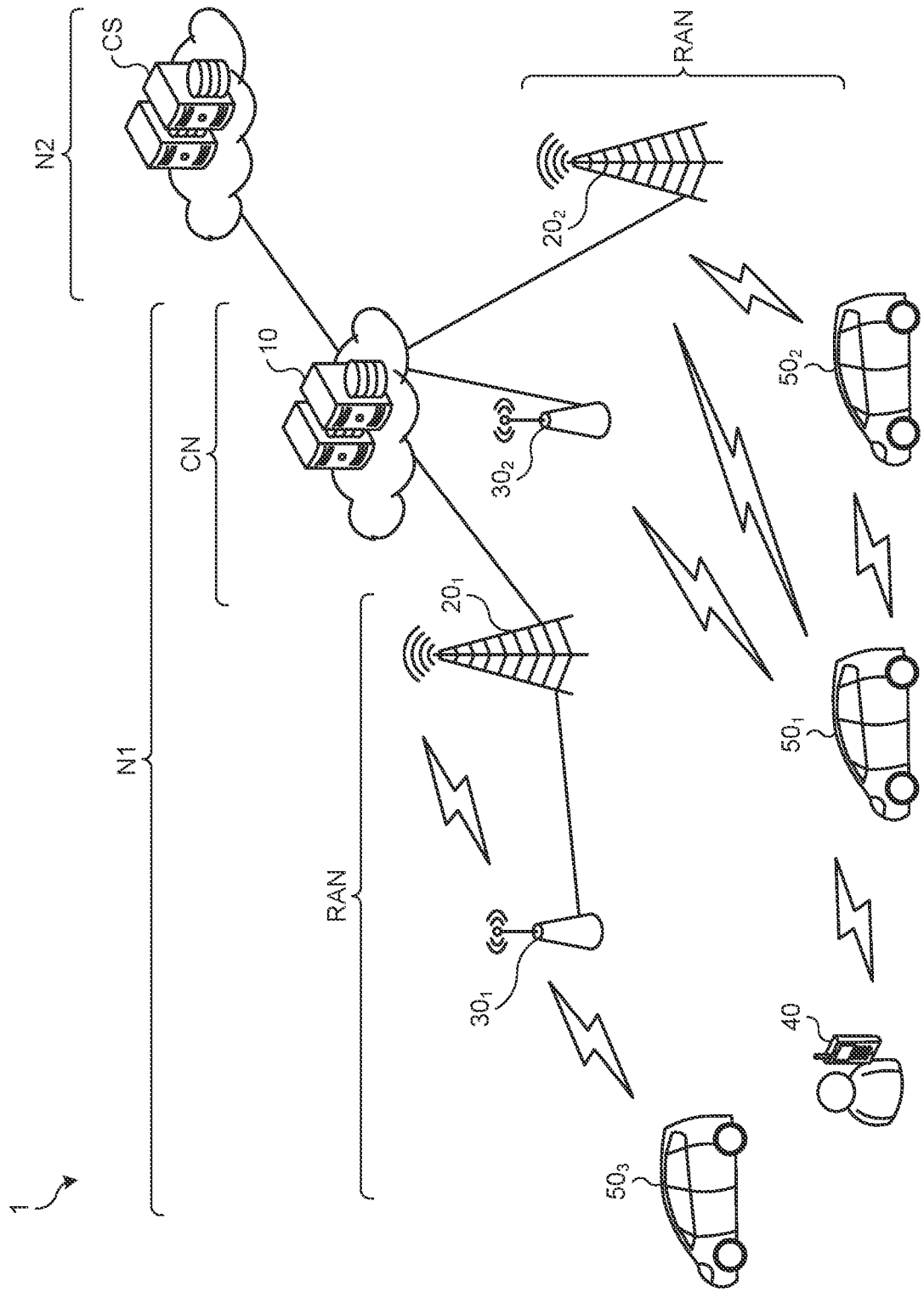
FIG. 11 is a diagram illustrating a specific configuration example of the information processing system.

FIG. 10 is a diagram illustrating a configuration example of the information processing system 1 according to the embodiment of the present disclosure. The information processing system 1 includes a management device 10, a base station device 20, a base station device 30, a terminal device 40, and a mobile device 50. Further, FIG. 11 is a diagram illustrating a specific configuration example of the information processing system 1. The information processing system 1 may include a cloud server device CS in addition to the above configuration.

A network N1 is composed of the plurality of devices constituting the information processing system 1. The network N1 is, for example, a radio network. For example, network N1 is a mobile communication network configured using radio access technologies such as the LTE and the NR. Network N1 is composed of a radio access network RAN and a core network CN.

The device in the figure may be considered as a device in a logical sense. In other words, some of the devices in the figure are realized by a virtual machine (VM), a container, a docker, and the like, and they may be implemented on the same physically identical hardware.

[Cloud Server Device]

The cloud server device CS is a processing device (for example, a server device) connected to a network N2. For example, the cloud server device CS is a server host computer that processes a request from a client computer (for example, the mobile device 50). The cloud server device CS may be a PC server, a midrange server, or a mainframe server. Here, the network N2 is a communication network connected to the network N1 via a gateway device (for example, an S-GW or a P-GW). For example, network N2 is, for example, is a communication network such as the Internet, a regional internet protocol (IP) network, and a telephone network (for example, a fixed telephone network and a mobile phone network). The cloud server device can be rephrased as a server device, a processing device, or an information processing device.

[Management Device]

The management device 10 is a device that manages a radio network. For example, the management device 10 is a device that functions as a mobility management entity (MME) or an access and mobility management function (AMF). The management device 10 and the gateway device constitute part of the core network CN. The core network CN is a network owned by a predetermined entity such as a mobile network operator. For example, the core network CN is an evolved packet core (EPC) or a 5G core network (5GC). The predetermined entity may be the same as the entity that uses, operates, and/or manages the base station devices 20 and 30, or may be different.

The management device 10 may have a gateway function. For example, when the core network is an EPC, the management device 10 may have a function as an S-GW or a P-GW. Further, when the core network is a 5GC, the management device 10 may have a function as a user plane function (UPF). The management device 10 does not necessarily have to be a device that constitutes the core network CN. For example, it is assumed that the core network CN is a core network of a wideband code division multiple access (W-CDMA) or a code division multiple access 2000 (cdma2000). At this time, the management device 10 may be a device that functions as a radio network controller (RNC).

The management device 10 is connected to each of the plurality of base station devices 20 and the plurality of base station devices 30. The management device 10 manages the communication with the base station device 20 and the base station device 30. For example, the management device 10 grasps and manages, for each mobile device 50, which base station device (or which cell) the mobile device 50 in the network N1 is connected to, which base station device (or cell) the mobile device 50 is in the communication area of, and the like. The cell is, for example, a primary cell (pCell) or a secondary cell (sCell). The cell may have, for each cell, different radio resources (for example, a frequency channel, a component carrier, and the like) that can be used by the mobile device 50. Moreover, one base station device may provide a plurality of cells.

[Base Station Device]

The base station device 20 is a radio communication device that radio communicates with the terminal device 40 and the mobile device 50. The base station device 20 is a device that constitutes a network in the V2N communication. The base station device 20 is a type of communication device. The base station device 20 is, for example, a device corresponding to a radio base station (Base Station, Node B, eNB, gNB, and the like) or a radio access point. The base station device 20 may be a radio relay station. The base station device 20 may be an optical remote device called a remote radio head (RRH). In the present embodiment, the base station of the radio communication system may be referred to as a base station device. The base station device 20 may be configured to be capable of radio communicating with another base station device 20 and base station device 30. The radio access technology used by the base station device 20 may be a cellular communication technology or a radio LAN technology. Of course, the radio access technology used by the base station device 20 is not limited to these, and may be another radio access technology. Further, the radio communication used by the base station device 20 may be radio communication using radio waves, or radio communication (optical radio) using infrared rays or visible light.

The base station device 30 is a radio communication device that radio communicates with the terminal device 40 and the mobile device 50. It is a device that constitutes the infrastructure in the V2I communication. The base station device 30 is a kind of communication device like the base station device 20. The base station device 30 is, for example, a device corresponding to a radio base station (Base Station, Node B, eNB, gNB, and the like) or a radio access point. The base station device 30 may be a radio relay station. The base station device 30 may be a road base station device such as a road side unit (RSU). Further, the base station device 20 may be an optical remote device called a remote radio head (RRH). The base station device 30 may be configured to be capable of radio communicating with another base station device 30 and the base station device 20. The radio access technology used by the base station device 30 may be a cellular communication technology or a radio LAN technology. Of course, the radio access technology used by the base station device 20 is not limited to these, and may be another radio access technology. Further, the radio communication used by the base station device 30 may be radio communication using radio waves, or radio communication (optical radio) using infrared rays or visible light.

The base station devices 20 and 30 may be able to communicate with each other via an interface (for example, S1 interface) between a base station device and a core network. This interface may be wired or wireless. Further, the base station devices may be able to communicate with each other via an interface (for example, X2 interface, S1 interface, and the like) between the base station devices. This interface may be wired or wireless.

Base station devices 20 and 30 can be used, operated, and/or managed by various entities. For example, it can be assumed that examples of the entity include a mobile network operator (MNO), a mobile virtual network operator (MVNO), a mobile virtual network enabler (MVNE), a neutral host network (NHN) operator, an enterprise, an educational institution (a school corporation, a local government education committee, and the like), a real estate (a building, a condominium, and the like) administrator, an individual, and the like. Of course, the entity of use, operation, and/or management of the base station devices 20 and 30 is not limited to these. The base station devices 20 and 30 may be installed and/or operated by one operator, or may be installed and/or operated by one individual. Of course, the installation/operation entity of the base station device 20 is not limited to these. For example, the base station devices 20 and 30 may be jointly installed and operated by a plurality of operators or a plurality of individuals. Further, the base station devices 20 and 30 may be shared facility used by a plurality of operators or a plurality of individuals. In this case, the installation and/or operation of the facility may be carried out by a third party different from the user.

The concept of the base station device (also referred to as a base station) includes not only a donor base station but also a relay base station (also referred to as a relay station or a relay station device). Further, the concept of the base station includes not only a structure having a function of a base station but also a device installed in the structure. The structure is, for example, a building such as a high-rise building, a house, a steel tower, a station facility, an airport facility, a port facility, or a stadium. In addition, the concept of structure includes not only the building, but also non-building structures such as a tunnel, a bridge, a dam, a fence, and an iron pillar, and facilities such as a crane, a gate, and a wind turbine. The concept of structure includes not only structures on land (ground in a narrow sense) or underground, but also structures on water such as a pier and a mega float, and structures underwater such as an ocean observation facility. The base station device can be rephrased as a processing device or an information processing device.

The base station devices 20 and 30 may be a fixed station or may be a movably configured base station device (mobile station). For example, the base station devices 20 and 30 may be a device installed on the mobile body or may be the mobile body itself. For example, a relay station device having mobility can be regarded as the base station devices 20 and 30 as a mobile station. Also, a device having a base station device function (at least part of the base station device function) such as a vehicle, a drone, a smartphone, or the like, which is originally a device with mobility, also corresponds to the base station devices 20 and 30 as a mobile station.

Here, the mobile body may be a mobile terminal such as a smartphone or a mobile phone. Further, the mobile body may be a mobile body (for example, a vehicle such as an automobile, a bicycle, a bus, a truck, a motorcycle, a train, a linear motor vehicle, and the like) that moves on land (ground in a narrow sense), or may be a mobile body (for example, subway) that moves underground (for example, in a tunnel). Further, the mobile body may be a mobile body (for example, a ship such as a passenger ship, a cargo ship, or a hovercraft) that moves on the water, or may be a mobile body that moves underwater (for example, a submersible ship such as a submersible boat, a submarine, or an unmanned submarine). Further, the mobile body may be a mobile body (for example, an aircraft such as an airplane, an airship, or a drone) moving in the atmosphere, or may be a mobile body (for example, an artificial celestial body such as an artificial satellite, a spacecraft, a space station, or a space research craft) that moves outside the atmosphere.

Further, the base station devices 20 and 30 may be a ground base station device (ground station device) installed on the ground. For example, the base station devices 20 and 30 may be a base station device disposed in a structure on the ground, or may be a base station device installed in a mobile body moving on the ground. More specifically, the base station devices 20 and 30 may be an antenna installed in a structure such as a building and a signal processing device connected to the antenna. Of course, the base station devices 20 and 30 may be a structure or a mobile body itself. "Ground" means not only on land (ground in a narrow sense) but also on the ground in a broad sense including underground, on water, and underwater. The base station devices 20 and 30 are not limited to the ground base station devices. The base station devices 20 and 30 may be a non-ground base station device (non-ground station device) capable of floating in the air or space. For example, the base station devices 20 and 30 may be an aircraft station device or a satellite station device.

The aircraft station device is a radio communication device that can float in the atmosphere such as an aircraft. The aircraft station device may be a device mounted on an aircraft or the like, or may be an aircraft itself. The concept of the aircraft includes not only the heavy aircraft such as an airplane and a glider, but also the light aircraft such as a balloon and an airship. The concept of the aircraft includes not only the heavy aircraft and the light aircraft, but also the rotary-wing aircraft such as a helicopter and an autogyro. The aircraft station device (or the aircraft on which the aircraft station device is mounted) may be an unmanned aerial vehicle such as a drone. In addition, the concept of the unmanned aerial vehicle includes unmanned aircraft systems (UAS) and tethered UAS. Also, the concept of the unmanned aerial vehicle includes lighter than air UAS (LTA) and heavier than air UAS (HTA). In addition, the concept of the unmanned aerial vehicle also includes high altitude UAS platforms (HAPs).

The satellite station device is a radio communication device that can float outside the atmosphere. The satellite station device may be a device mounted on a space mobile body such as an artificial satellite, or may be a space mobile body itself. The satellite that serves as the satellite station device may be any of a low earth orbiting (LEO) satellite, a medium earth orbiting (MEO) satellite, a geostationary earth orbiting (GEO) satellite, and a highly elliptical orbiting (HEO) satellite. Of course, the satellite station device may be a device mounted on a low earth orbiting satellite, a medium earth orbiting satellite, a geostationary earth orbiting satellite, or a highly elliptical orbiting satellite.

The size of the coverage of the base station devices 20 and 30 may be as large as a macro cell or as small as a pico cell. Of course, the size of the coverage of the base station devices 20 and 30 may be extremely small, such as a femtocell. Further, the base station devices 20 and 30 may have a beamforming capability. In this case, the base station devices 20 and 30 may have cells or service areas formed for each beam.

[Terminal Device and Mobile Device]

The terminal device 40 is a radio communication device that radio communicates with the base station device 20 or the base station device 30. The terminal device 40 is, for example, a mobile phone, a smart device (smartphone or tablet), a personal digital assistant (PDA), and a personal computer. The mobile device 50 may be a machine to machine (M2M) device or an Internet of things (IoT) device. The terminal device 40 is capable of performing sidelink communication with the mobile device 50 and another terminal device 40. The terminal device 40 can use an automatic repeat technology such as the HARQ when performing sidelink communication. The radio communication (including sidelink communication) used by the terminal device 40 may be radio communication using radio waves, or may be radio communication (optical radio) using infrared rays or visible light.

The mobile device 50 is a mobile radio communication device that radio communicates with the base station device 20 or the base station device 20. The mobile device 50 may be a radio communication device installed on the mobile body, or may be the mobile body itself. For example, the mobile device 50 may be a vehicle moving on the road such as an automobile, a bus, a truck, or a motorcycle, or a radio communication device mounted on the vehicle. The mobile device 50 is capable of performing sidelink communication with the terminal device 40 and another mobile device 50. The mobile device 50 can use an automatic repeat technology such as the HARQ when performing sidelink communication. The radio communication (including sidelink communication) used by the mobile device 50 may be radio communication using radio waves, or may be radio communication (optical radio) using infrared rays or visible light.

The "mobile device" is a type of communication device, and is also referred to as a mobile station, a mobile station device, a terminal device, or a terminal. The concept of the "mobile device" includes not only a communication device configured to be movable but also a mobile body in which the communication device is installed. At this time, the mobile body may be a mobile terminal, or may be a mobile body that moves on land (ground in a narrow sense), underground, on water, or underwater. Further, the mobile body may be a mobile body that moves in the atmosphere such as a drone or a helicopter, or may be a mobile body that moves outside the atmosphere such as an artificial satellite.

In the present embodiment, the concept of the communication device includes not only a portable mobile device (terminal device) such as a mobile terminal, but also a device installed on a structure or a mobile body. The structure or the mobile body itself may be regarded as a communication device. Further, the concept of the communication device includes not only a mobile device (terminal device, automobile, and the like) but also a base station device (donor base station, relay base station, and the like).

The communication device is a type of processing device and information processing device.

The mobile device 50 and the terminal device 40, and the base station devices 20 and 30 are connected to each other by radio communication (for example, radio wave or optical radio). When the mobile device 50 moves from the communication area (or cell) of one base station device to the communication area (or cell) of another base station device, it performs a handover (or handoff).

The mobile device 50 and the terminal device 40 may be connected to a plurality of base station devices or a plurality of cells at the same time to perform communication. For example, when one base station device supports a communication area through a plurality of cells (for example, pCell, sCell), with the carrier aggregation (CA) technology, the dual connectivity (DC) technology, and the multi-connectivity (MC) technology, it is possible to bundle the plurality of cells to perform communication between the mobile device 50 and the base station device (or between the terminal device 40 and the base station device). Alternatively, via a cell of a different base station device, by using coordinated multi-point transmission and reception (CoMP) technology, it is also possible for the mobile device 50 and the terminal device 40 to communicate with the plurality of base station devices.

The mobile device 50 and the terminal device 40 do not necessarily have to be a device directly used by a person. The mobile device 5 and the terminal device 400 may be a sensor installed in a machine or the like in a factory, such as a so-called machine type communication (MTC). Further, the mobile device 50 may be a machine to machine (M2M) device or an Internet of things (IoT) device. In addition, the mobile device 50 and the terminal device 40 may be a device having a relay communication function as represented by the device to device (D2D) and the vehicle to everything (V2X). Further, the mobile device 50 and the terminal device 40 may be a device called client premises equipment (CPE) used in a radio backhaul or the like.

Hereinafter, the configuration of each device constituting the information processing system 1 according to the present embodiment will be specifically described.

<2-2. Configuration of Management Device>

The management device 10 is a device that manages a radio network. For example, the management device 10 is a device that manages the communication of the base station devices 20 and 30. When the core network CN is an EPC, the management device 10 is, for example, a device having a function as an MME. Further, when the core network CN is a 5GC, the management device 10 is, for example, a device having a function as an AMF. The management device 10 has an application processing execution function (for example, an edge function), and may function as a server device such as an application server.

Figure 12:
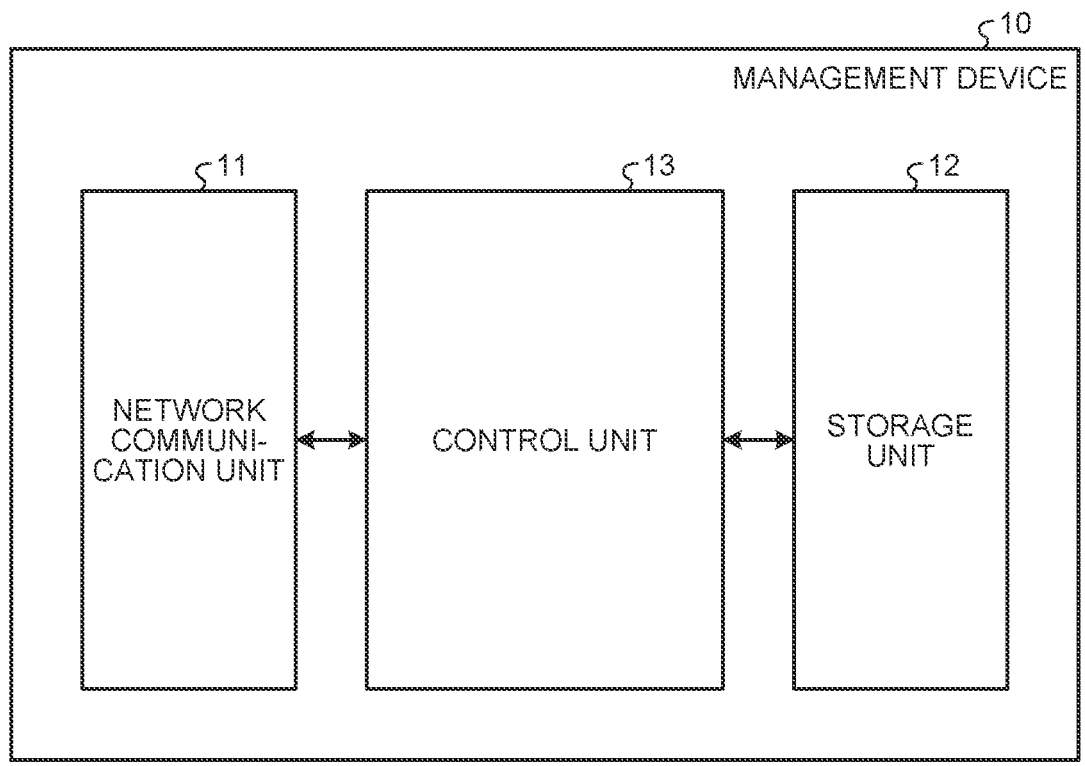
FIG. 12 is a diagram illustrating a configuration example of a management device according to the embodiment of the present disclosure.

FIG. 12 is a diagram illustrating a configuration example of the management device 10 according to the embodiment of the present disclosure. The management device 10 includes a network communication unit 11, a storage unit 12, and a control unit 13. The configuration illustrated in FIG. 12 is a functional configuration, and the hardware configuration may be different from this. Further, the function of the management device 10 may be distributed and implemented in a plurality of physically separated configurations. For example, the management device 10 may be composed of a plurality of server devices.

The network communication unit 11 is a communication interface for communicating with other devices. The network communication unit 11 may be a network interface or an equipment connection interface. The network communication unit 11 has a function of directly or indirectly connecting it to the network N1. For example, the network communication unit 11 may include a local area network (LAN) interface such as a network interface card (NIC), or may include a USB interface composed of a Universal Serial Bus (USB) host controller, a USB port, and the like. Further, the network communication unit 11 may be a wired interface or a wireless interface. The network communication unit 11 functions as a communication means of the management device 10. The network communication unit 11 communicates with the base station devices 20 and 30 under the control of the control unit 13.

The storage unit 12 is a data readable/writable storage device such as a dynamic random access memory (DRAM), a static random access memory (SRAM), a flash memory, and a hard disk. The storage unit 12 functions as a storage means for the management device 10. The storage unit 12 stores, for example, the connection state of the mobile device 50. For example, the storage unit 12 stores the radio resource control (RRC) state and the EPS connection management (ECM) state of the mobile device 50. The storage unit 12 may function as a home memory that stores the position information of the mobile device 50.

The control unit 13 is a controller that controls each unit of the management device 10. The control unit 13 is, for example, realized by a processor such as a central processing unit (CPU) or a micro processing unit (MPU). For example, the control unit 13 is realized by the processor executing various programs stored in the storage device inside the management device 10 with a random access memory (RAM) or the like as a work area. The control unit 13 may be realized by an integrated circuit such as an application specific integrated circuit (ASIC) or a field programmable gate array (FPGA). The CPU, the MPU, the ASIC, and the FPGA can all be considered controllers.

<2-3. Configuration of Base Station Device (Network)>

Next, the configuration of the base station device 20 will be described. The base station device 20 is a radio communication device that radio communicates with the mobile device 50. The base station device 20 is a device that functions as, for example, a radio base station, a radio relay station, a radio access point, or the like. At this time, the base station device 20 may be an optical remote device such as the RRH. As described above, the base station device 20 is a device that constitutes a network in the V2N communication.

Figure 13:
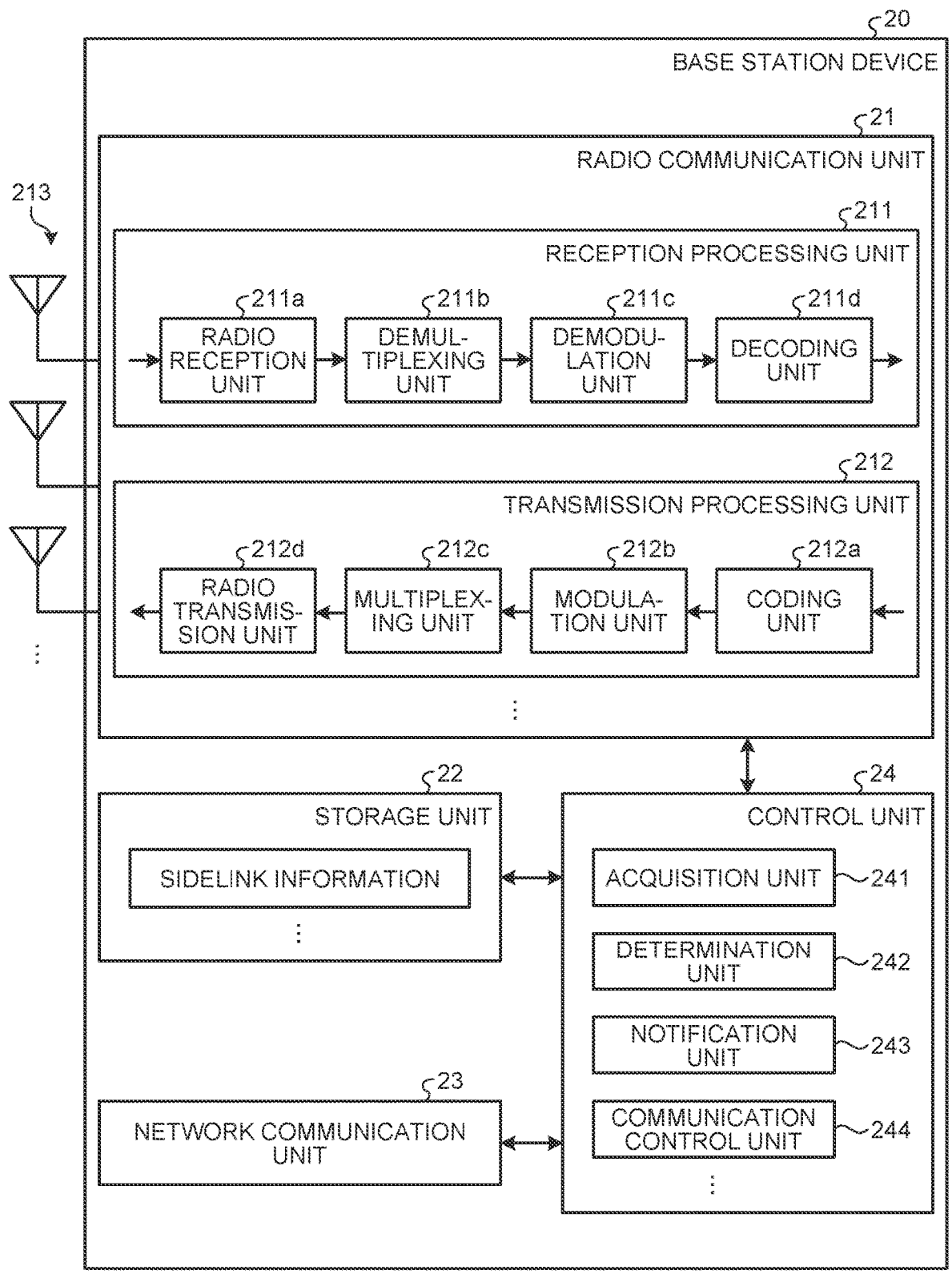
FIG. 13 is a diagram illustrating a configuration example of a base station device according to the embodiment of the present disclosure.

FIG. 13 is a diagram illustrating a configuration example of the base station device 20 according to the embodiment of the present disclosure. The base station device 20 includes a radio communication unit 21, a storage unit 22, a network communication unit 23, and a control unit 24. The configuration illustrated in FIG. 13 is a functional configuration, and the hardware configuration may be different from this. Further, the function of the base station device 20 may be distributed and implemented in a plurality of physically separated configurations.

The radio communication unit 21 is a radio communication interface that radio communicates with other radio communication devices (for example, the mobile device 50, the base station device 30, and another base station device 20). The radio communication unit 21 operates under the control of the control unit 24. The radio communication unit 21 may support a plurality of radio access methods. For example, the radio communication unit 21 may support both the NR and the LTE. The radio communication unit 21 may support the W-CDMA or the cdma2000 in addition to the NR and the LTE. Of course, the radio communication unit 21 may support a radio access method other than the NR, the LTE, the W-CDMA and the cdma2000.

The radio communication unit 21 includes a reception processing unit 211, a transmission processing unit 212, and an antenna 213. The radio communication unit 21 may include a plurality of reception processing units 211, transmission processing units 212, and antennas 213. When the radio communication unit 21 supports a plurality of radio access methods, each unit of the radio communication unit 21 may be individually configured for each radio access method. For example, the reception processing unit 211 and the transmission processing unit 212 may be individually configured by the LTE and the NR.

The reception processing unit 211 processes the uplink signal received via the antenna 213. The reception processing unit 211 includes a radio reception unit 211a, a demultiplexing unit 211b, a demodulation unit 211c, and a decoding unit 211d.

The radio reception unit 211a performs, on the uplink signal, down-conversion, removal of unnecessary frequency components, control of amplification level, orthogonal demodulation, conversion to digital signals, removal of guard intervals, extraction of frequency domain signals by fast Fourier transform, and the like. The demultiplexing unit 211b separates, from the signal output from the radio reception unit 211a, uplink channels such as a physical uplink shared channel (PUSCH) and a physical uplink control channel (PUCCH) and uplink reference signals. The demodulation unit 211c demodulates the received signal using a modulation system such as binary phase shift keying (BPSK) or quadrature phase shift keying (QPSK) for the modulation symbol of the uplink channel. The modulation system used by the demodulation unit 211c may be a 16 quadrature amplitude modulation (QAM), a 64QAM, or a 256QAM. The decoding unit 211d performs decoding processing on the coded bits of the demodulated uplink channel. The decoded uplink data and uplink control information are output to the control unit 24.

The transmission processing unit 212 performs transmission process of downlink control information and downlink data. The transmission processing unit 212 includes a coding unit 212a, a modulation unit 212b, a multiplexing unit 212c, and a radio transmission unit 212d.

The coding unit 212a encodes the downlink control information and the downlink data input from the control unit 24 by using a coding method such as block coding, convolutional coding, or turbo coding. The modulation unit 212b modulates the coded bits output from the coding unit 212a by a predetermined modulation system such as the BPSK, the QPSK, the 16QAM, the 64QAM, the 256QAM, or the like. The multiplexing unit 212c multiplexes the modulation symbol of each channel and the downlink reference signal and arranges them in a predetermined resource element. The radio transmission unit 212d performs various signal process on the signal from the multiplexing unit 212c. For example, the radio transmission unit 212d perform processes such as conversion to the time domain by fast Fourier transform, addition of a guard interval, generation of a baseband digital signal, conversion to an analog signal, quadrature modulation, upconversion, removal of extra frequency components, and power amplification. The signal generated by the transmission processing unit 212 is transmitted from the antenna 213.

The storage unit 22 is a storage device that can read and write data such as a DRAM, an SRAM, a flash memory, and a hard disk. The storage unit 22 functions as a storage means for the base station device 20. The storage unit 22 stores sidelink information and the like. The sidelink information is information about a sidelink between communication devices. The sidelink information will be described later.

The network communication unit 23 is a communication interface for communicating with other devices (for example, the management device 10, another base station device 20, the base station device 30, the cloud server device CS, and the like). The network communication unit 23 has a function of directly or indirectly connecting it to the network N1. For example, the network communication unit 23 includes a LAN interface such as an NIC. Further, the network communication unit 23 may be a wired interface or a wireless interface. The network communication unit 23 functions as a network communication means of the base station device 20. The network communication unit 23 communicates with other devices (for example, the management device 10, the cloud server device CS, and the like) under the control of the control unit 24. The configuration of the network communication unit 23 may be the same as that of the network communication unit 11 of the management device 10.

The control unit 24 is a controller that controls each unit of the base station device 20. The control unit 24 is, for example, realized by a processor such as a central processing unit (CPU) or a micro processing unit (MPU). For example, the control unit 24 is realized by the processor executing various programs stored in the storage device inside the base station device 20 with a random access memory (RAM) or the like as a work area. The control unit 24 may be realized by an integrated circuit such as an application specific integrated circuit (ASIC) or a field programmable gate array (FPGA). The CPU, the MPU, the ASIC, and the FPGA can all be considered controllers.

As illustrated in FIG. 13, the control unit 24 includes an acquisition unit 241, a determination unit 242, a notification unit 243, and a communication control unit 244. Each block (the acquisition unit 241 to the communication control unit 244) constituting the control unit 24 is a functional block indicating the function of the control unit 24. These functional blocks may be software blocks or hardware blocks. For example, each of the above functional blocks may be one software module realized by software (including microprograms), or may be one circuit block on a semiconductor chip (die). Of course, each functional block may be one processor or one integrated circuit. The method of configuring the functional block is arbitrary. The control unit 24 may be configured in a functional unit different from the above-mentioned functional block. The operation of each block (the acquisition unit 241 to the communication control unit 244) constituting the control unit 24 will be described in detail later.

<2-4. Configuration of Base Station Device (Infrastructure)>

Next, the configuration of the base station device 30 will be described. The base station device 30 is a radio communication device that radio communicates with the mobile device 50. The base station device 30 is a device that functions as, for example, a radio base station, a radio relay station, a radio access point, or the like. At this time, the base station device 30 may be a road base station device such as the RSU, or an optical remote device such as the RRH. As described above, the base station device 30 is a device that constitutes an infrastructure in the V2I communication.

Figure 14:
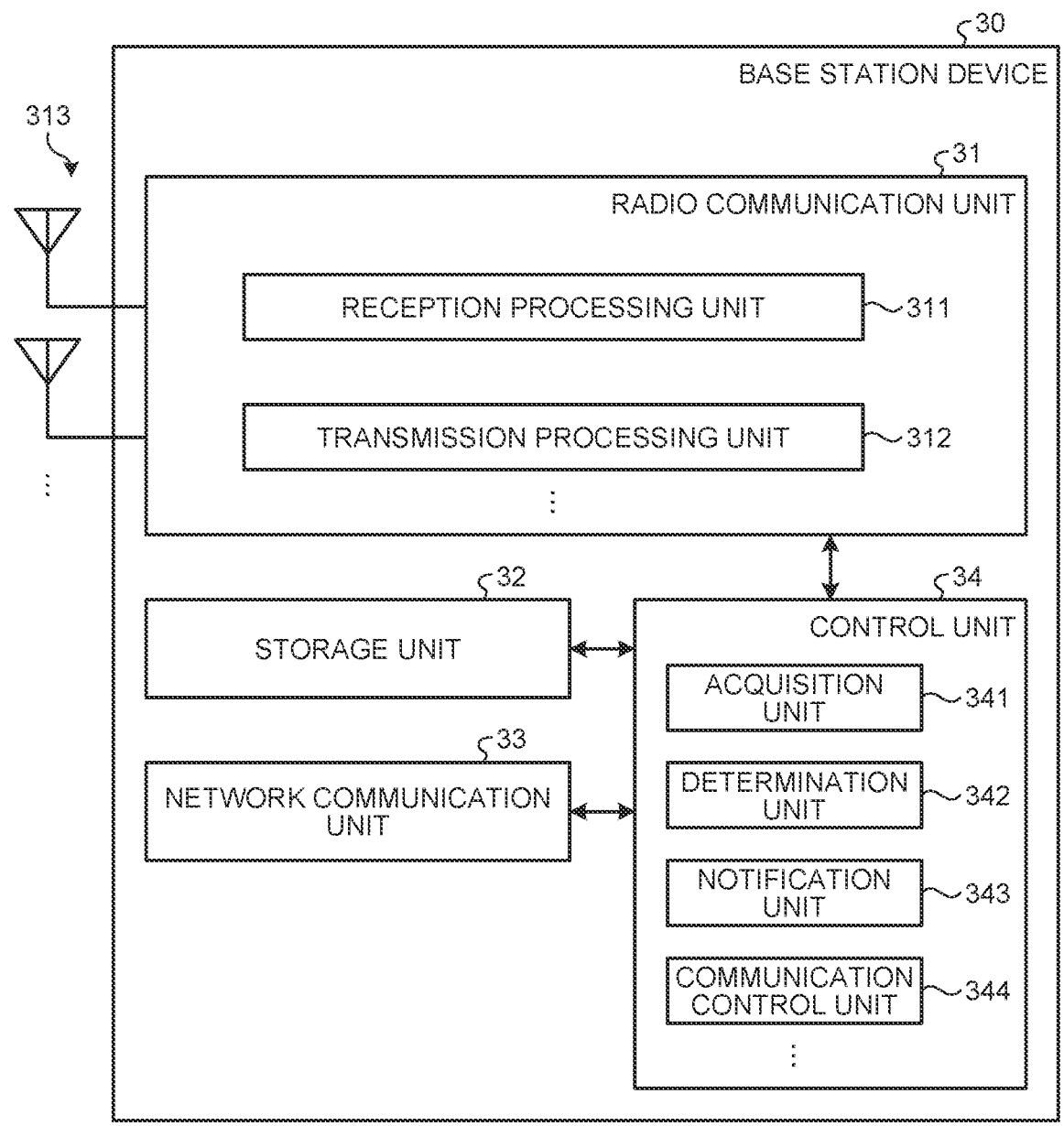
FIG. 14 is a diagram illustrating a configuration example of a base station device according to the embodiment of the present disclosure.

FIG. 14 is a diagram illustrating a configuration example of the base station device 30 according to the embodiment of the present disclosure. The base station device 30 includes a radio communication unit 31, a storage unit 32, a network communication unit 33, and a control unit 34. The configuration illustrated in FIG. 14 is a functional configuration, and the hardware configuration may be different from this. Further, the function of the base station device 30 may be distributed and implemented in a plurality of physically separated configurations.

The radio communication unit 31 is a radio communication interface that radio communicates with other radio communication devices (for example, the mobile device 50, the base station device 20, and another base station device 30). The radio communication unit 31 operates under the control of the control unit 34. The radio communication unit 31 includes a reception processing unit 311, a transmission processing unit 312, and an antenna 313. The configuration of the radio communication unit 31 (the reception processing unit 311, the transmission processing unit 312, and the antenna 313) is the same as that of the radio communication unit 21 (the reception processing unit 211, the transmission processing unit 212, and the antenna 213) of the base station device 20.

The storage unit 32 is a storage device that can read and write data such as a DRAM, an SRAM, a flash memory, and a hard disk. The storage unit 32 functions as a storage means for the base station device 30. The configuration of the storage unit 32 is the same as that of the storage unit 22 of the base station device 20.

The network communication unit 33 is a communication interface for communicating with other devices (for example, the management device 10, the base station device 20, another base station device 30, the cloud server device CS, and the like). The network communication unit 33 has a function of directly or indirectly connecting it to the network N1. For example, the network communication unit 33 includes a LAN interface such as an NIC. Further, the network communication unit 33 may be a wired interface or a wireless interface. The network communication unit 33 functions as a network communication means of the base station device 30. The configuration of the network communication unit 33 is the same as that of the network communication unit 23 of the base station device 20.

The control unit 34 is a controller that controls each unit of the base station device 30. The control unit 34 is realized by, for example, a processor such as a CPU or an MPU. For example, the control unit 34 is realized by the processor executing various programs stored in the storage device inside the base station device 30 with a RAM or the like as a work area. The control unit 34 may be realized by an integrated circuit such as an ASIC or an FPGA. The CPU, the MPU, the ASIC, and the FPGA can all be considered controllers.

As illustrated in FIG. 14, the control unit 34 includes an acquisition unit 341, a determination unit 342, a notification unit 343, and a communication control unit 344. Each block (the acquisition unit 341 to the communication control unit 344) constituting the control unit 34 is a functional block indicating the function of the control unit 34. These functional blocks may be software blocks or hardware blocks. For example, each of the above functional blocks may be one software module realized by software (including microprograms), or may be one circuit block on a semiconductor chip (die). Of course, each functional block may be one processor or one integrated circuit. The method of configuring the functional block is arbitrary. The control unit 34 may be configured in a functional unit different from the above-mentioned functional block. The operation of each block of the control unit 34 may be the same as the operation of each block (the acquisition unit 241 to the communication control unit 244) of the control unit 24 described later. The description of the acquisition unit 241 to the communication control unit 244 appearing in the following description can be appropriately replaced with the acquisition unit 341 to the communication control unit 344.

<2-5. Configuration of Terminal Device>

Next, the configuration of the terminal device 40 will be described. The terminal device 40 is a mobile radio communication device. For example, the terminal device 40 may be a user terminal such as a mobile phone or a smart device. The terminal device 40 is capable of performing radio communicating with the base station device 20 and the base station device 30. Further, the terminal device 40 is capable of performing sidelink communication with the mobile device 50 and another terminal device 40. At this time, the terminal device 40 can use an automatic repeat technology such as the HARQ.

Figure 15:
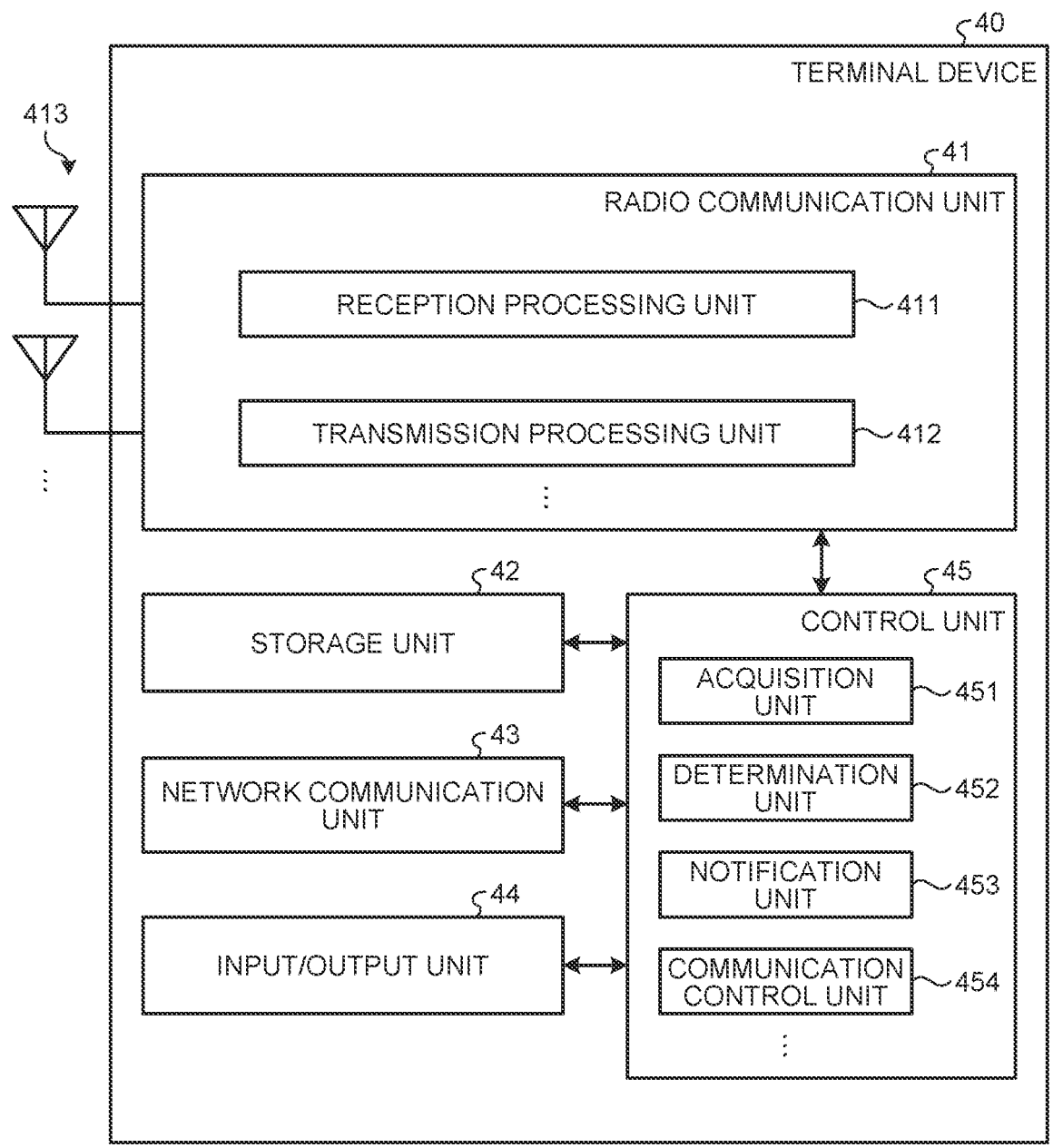
FIG. 15 is a diagram illustrating a configuration example of a terminal device according to the embodiment of the present disclosure.

FIG. 15 is a diagram illustrating a configuration example of the terminal device 40 according to the embodiment of the present disclosure. The terminal device 40 includes a radio communication unit 41, a storage unit 42, a network communication unit 43, an input/output unit 44, and a control unit 45. The configuration illustrated in FIG. 15 is a functional configuration, and the hardware configuration may be different from this. Further, the function of the terminal device 40 may be distributed and implemented in a plurality of physically separated configurations.

The radio communication unit 41 is a radio communication interface that radio communicates with other radio communication devices (for example, the base station device 20 and the base station device 30). The radio communication unit 41 operates under the control of the control unit 45. The radio communication unit 41 supports one or a plurality of radio access methods. For example, the radio communication unit 41 supports both the NR and the LTE. The radio communication unit 41 may support the W-CDMA and the cdma2000 in addition to the NR and the LTE. In addition, the radio communication unit 21 supports communication using the NOMA. The NOMA will be described in detail later.

The radio communication unit 41 includes a reception processing unit 411, a transmission processing unit 412, and an antenna 413. The radio communication unit 41 may include a plurality of reception processing units 411, transmission processing units 412, and antennas 413. When the radio communication unit 41 supports a plurality of radio access methods, each unit of the radio communication unit 41 may be individually configured for each radio access method. For example, the reception processing unit 411 and the transmission processing unit 412 may be individually configured by the LTE and the NR.

The reception processing unit 411 processes the downlink signal received via the antenna 413. The reception processing unit 411 includes a radio reception unit 411a, a demultiplexing unit 411b, a demodulation unit 411c, and a decoding unit 411d.

The radio reception unit 411a performs, on the downlink signal, down-conversion, removal of unnecessary frequency components, control of amplification level, orthogonal demodulation, conversion to digital signals, removal of guard intervals, extraction of frequency domain signals by fast Fourier transform, and the like. The demultiplexing unit 411b separates the downlink channel, the downlink synchronization signal, and the downlink reference signal from the signal output from the radio reception unit 411a. The downlink channel is, for example, a physical broadcast channel (PBCH), a physical downlink shared channel (PDSCH), a physical downlink control channel (PDCCH), and the like. The demodulation unit 211c demodulates the received signal using a modulation system such as the BPSK, the QPSK, the 16QAM, the 64QAM, or the 256QAM for the modulation symbol of the downlink channel. The decoding unit 411d performs decoding processing on the coded bits of the demodulated downlink channel. The decoded downlink data and downlink control information are output to the control unit 45.

The transmission processing unit 412 performs the transmission process of uplink control information and uplink data. The transmission processing unit 412 includes a coding unit 412a, a modulation unit 412b, a multiplexing unit 412c, and a radio transmission unit 412d.

The coding unit 412a encodes the uplink control information and the uplink data input from the control unit 45 by using a coding method such as block coding, convolutional coding, or turbo coding. The modulation unit 412b modulates the coded bits output from the coding unit 412a by a predetermined modulation system such as the BPSK, the QPSK, the 16QAM, the 64QAM, the 256QAM, or the like. The multiplexing unit 412c multiplexes the modulation symbol of each channel and the uplink reference signal and arranges them in a predetermined resource element. The radio transmission unit 412d performs various signal process on the signal from the multiplexing unit 412c. For example, the radio transmission unit 412d perform processes such as conversion to the time domain by inverse fast Fourier transform, addition of a guard interval, generation of a baseband digital signal, conversion to an analog signal, quadrature modulation, upconversion, removal of extra frequency components, and power amplification. The signal generated by the transmission processing unit 412 is transmitted from the antenna 413.

The storage unit 42 is a storage device that can read and write data such as a DRAM, an SRAM, a flash memory, and a hard disk. The storage unit 42 functions as a storage means for the terminal device 40.

The network communication unit 43 is a communication interface for communicating with other devices. For example, the network communication unit 43 is a LAN interface such as an NIC. The network communication unit 43 has a function of directly or indirectly connecting it to the network N1. The network communication unit 43 may be a wired interface or a wireless interface. The network communication unit 43 functions as a network communication means of the terminal device 40. The network communication unit 43 communicates with other devices under the control of the control unit 45.

The input/output unit 44 is a user interface for exchanging information with the user. For example, the input/output unit 44 is an operation device for the user to perform various operations such as a keyboard, a mouse, operation keys, and a touch panel. Alternatively, the input/output unit 44 is a display device such as a liquid crystal display or an organic electroluminescence (EL) display. The input/output unit 44 may be an audio device such as a speaker or a buzzer. Further, the input/output unit 44 may be a lighting device such as a light emitting diode (LED) lamp. The input/output unit 44 functions as an input/output means (input means, output means, operation means, or notification means) of the terminal device 40.

The control unit 45 is a controller that controls each unit of the terminal device 40. The control unit 45 is realized by, for example, a processor such as a CPU or an MPU. For example, the control unit 45 is realized by the processor executing various programs stored in the storage device inside the terminal device 40 with a RAM or the like as a work area. The control unit 45 may be realized by an integrated circuit such as an ASIC or an FPGA. The CPU, the MPU, the ASIC, and the FPGA can all be considered controllers.

As illustrated in FIG. 15, the control unit 45 includes an acquisition unit 451, a determination unit 452, a notification unit 453, and a communication control unit 454. Each block (the acquisition unit 451 to the communication control unit 454) constituting the control unit 45 is a functional block indicating the function of the control unit 45. These functional blocks may be software blocks or hardware blocks. For example, each of the above functional blocks may be one software module realized by software (including microprograms), or may be one circuit block on a semiconductor chip (die). Of course, each functional block may be one processor or one integrated circuit. The method of configuring the functional block is arbitrary. The control unit 45 may be configured in a functional unit different from the above-mentioned functional block. The operation of each block constituting the control unit 45 may be the same as the operation of each block (the acquisition unit 551 to the communication control unit 554) of the control unit 45 described later. The description of the acquisition unit 551 to the communication control unit 554 appearing in the following description can be appropriately replaced with the acquisition unit 451 to the communication control unit 454.

<2-6. Configuration of Mobile Device>

Next, the configuration of the mobile device 50 will be described. The mobile device 50 is a mobile radio communication device. For example, the mobile device 50 is a vehicle such as an automobile, or a radio communication device mounted on the vehicle. The mobile device 50 may be a mobile terminal device such as a mobile phone or a smart device. The mobile device 50 is capable of performing radio communicating with the base station device 20 and the base station device 30. In addition, the mobile device 50 is capable of performing sidelink communication with the terminal device 40 and another mobile device 50. At this time, the mobile device 50 can use an automatic repeat technology such as the HARQ.

Figure 16:
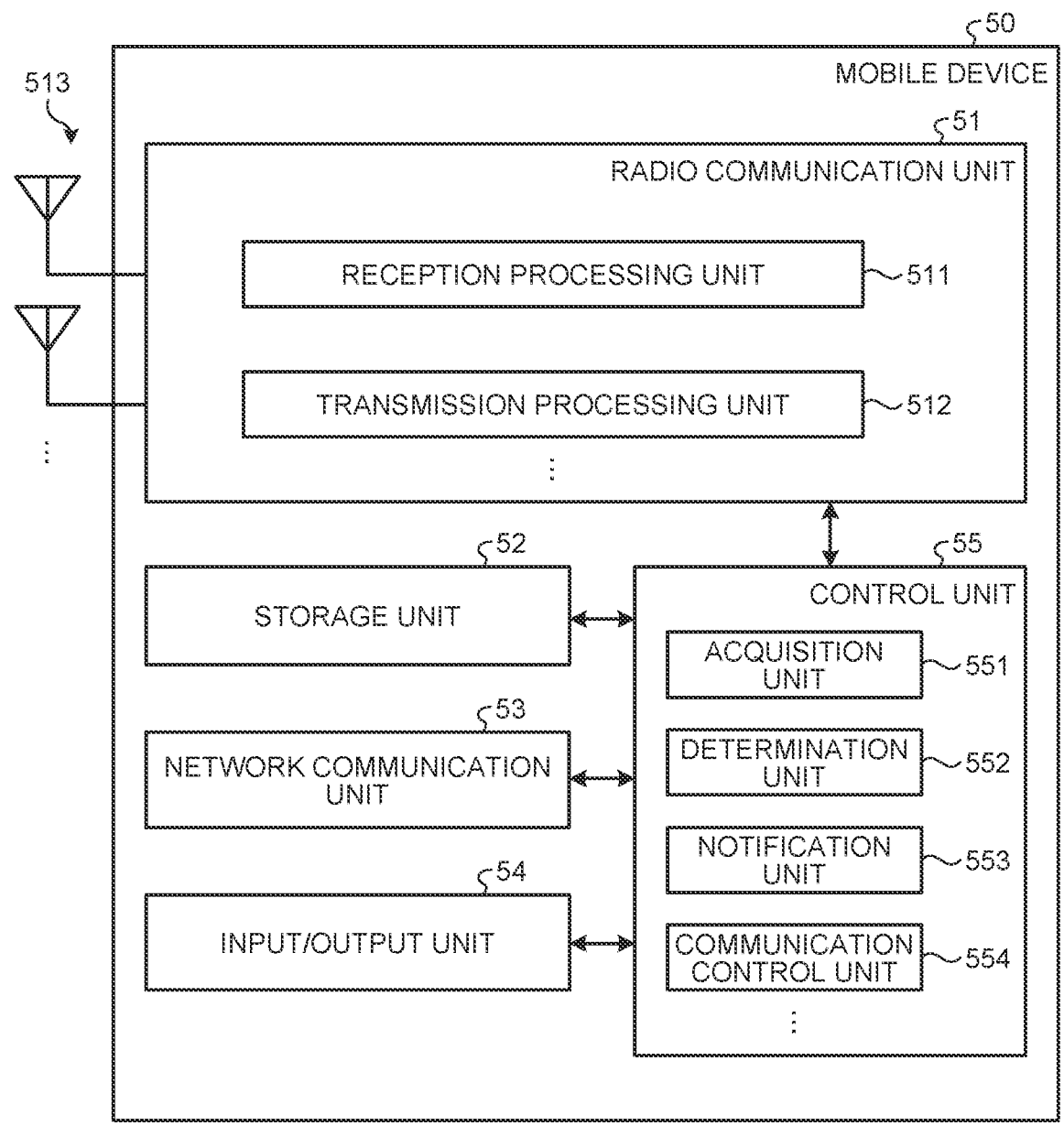
FIG. 16 is a diagram illustrating a configuration example of a mobile device according to the embodiment of the present disclosure.

FIG. 16 is a diagram illustrating a configuration example of the mobile device 50 according to the embodiment of the present disclosure. The mobile device 50 includes a radio communication unit 51, a storage unit 52, a network communication unit 53, an input/output unit 54, and a control unit 55. The configuration illustrated in FIG. 16 is a functional configuration, and the hardware configuration may be different from this. Further, the function of the mobile device 50 may be distributed and implemented in a plurality of physically separated configurations.

The radio communication unit 51 is a radio communication interface that radio communicates with other radio communication devices (for example, the base station device 20 and the base station device 30). The radio communication unit 51 operates under the control of the control unit 55. The radio communication unit 51 supports one or a plurality of radio access methods. For example, the radio communication unit 51 supports both the NR and the LTE. The radio communication unit 51 may support the W-CDMA or the cdma2000 in addition to the NR and the LTE. In addition, the radio communication unit 21 supports communication using the NOMA. The NOMA will be described in detail later.

The radio communication unit 51 includes a reception processing unit 511, a transmission processing unit 512, and an antenna 513. The radio communication unit 51 may include a plurality of reception processing units 511, transmission processing units 512, and antennas 513. When the radio communication unit 51 supports a plurality of radio access methods, each unit of the radio communication unit 51 may be individually configured for each radio access method. For example, the reception processing unit 511 and the transmission processing unit 512 may be individually configured by the LTE and the NR.

The reception processing unit 511 processes the downlink signal received via the antenna 513. The reception processing unit 511 includes a radio reception unit 511a, a demultiplexing unit 511b, a demodulation unit 511c, and a decoding unit 511d.

The radio reception unit 511a performs, on the downlink signal, down-conversion, removal of unnecessary frequency components, control of amplification level, orthogonal demodulation, conversion to digital signals, removal of guard intervals, extraction of frequency domain signals by fast Fourier transform, and the like. The demultiplexing unit 511b separates the downlink channel, the downlink synchronization signal, and the downlink reference signal from the signal output from the radio reception unit 511a. The downlink channel is, for example, a channel such as a PBCH, a PDSCH, or a PDCCH. The demodulation unit 211c demodulates the received signal using a modulation system such as the BPSK, the QPSK, the 16QAM, the 64QAM, or the 256QAM for the modulation symbol of the downlink channel. The decoding unit 511d performs decoding processing on the coded bits of the demodulated downlink channel. The decoded downlink data and downlink control information are output to the control unit 55.

The transmission processing unit 512 performs transmission process of uplink control information and uplink data. The transmission processing unit 512 includes a coding unit 512a, a modulation unit 512b, a multiplexing unit 512c, and a radio transmission unit 512d.

The coding unit 512a encodes the uplink control information and the uplink data input from the control unit 55 by using a coding method such as block coding, convolutional coding, or turbo coding. The modulation unit 512b modulates the coded bits output from the coding unit 512a by a predetermined modulation system such as the BPSK, the QPSK, the 16QAM, the 64QAM, the 256QAM, or the like. The multiplexing unit 512c multiplexes the modulation symbol of each channel and the uplink reference signal and arranges them in a predetermined resource element. The radio transmission unit 512d performs various signal process on the signal from the multiplexing unit 512c. For example, the radio transmission unit 512d perform processes such as conversion to the time domain by inverse fast Fourier transform, addition of a guard interval, generation of a baseband digital signal, conversion to an analog signal, quadrature modulation, upconversion, removal of extra frequency components, and power amplification. The signal generated by the transmission processing unit 512 is transmitted from the antenna 513.

The storage unit 52 is a storage device that can read and write data such as a DRAM, an SRAM, a flash memory, and a hard disk. The storage unit 52 functions as a storage means for the mobile device 50.

The network communication unit 53 is a communication interface for communicating with other devices. For example, the network communication unit 53 is a LAN interface such as an NIC. The network communication unit 53 has a function of directly or indirectly connecting it to the network N1. The network communication unit 53 may be a wired interface or a wireless interface. The network communication unit 53 functions as a network communication means of the mobile device 50. The network communication unit 53 communicates with other devices under the control of the control unit 55.

The input/output unit 54 is a user interface for exchanging information with the user. For example, the input/output unit 54 is an operation device for the user to perform various operations such as a keyboard, a mouse, operation keys, and a touch panel. Alternatively, the input/output unit 54 is a display device such as a liquid crystal display or an organic EL display. The input/output unit 54 may be an audio device such as a speaker or a buzzer. Further, the input/output unit 54 may be a lighting device such as an LED lamp. The input/output unit 54 functions as an input/output means (input means, output means, operation means, or notification means) of the mobile device 50.

The control unit 55 is a controller that controls each unit of the mobile device 50. The control unit 55 is realized by, for example, a processor such as a CPU or an MPU. For example, the control unit 55 is realized by the processor executing various programs stored in the storage device inside the mobile device 50 with a RAM or the like as a work area. The control unit 55 may be realized by an integrated circuit such as an ASIC or an FPGA. The CPU, the MPU, the ASIC, and the FPGA can all be considered controllers.

As illustrated in FIG. 16, the control unit 55 includes an acquisition unit 551, a determination unit 552, a notification unit 553, and a communication control unit 554. Each block (the acquisition unit 551 to the communication control unit 554) constituting the control unit 55 is a functional block indicating the function of the control unit 55. These functional blocks may be software blocks or hardware blocks. For example, each of the above functional blocks may be one software module realized by software (including microprograms), or may be one circuit block on a semiconductor chip (die). Of course, each functional block may be one processor or one integrated circuit. The method of configuring the functional block is arbitrary. The control unit 55 may be configured in a functional unit different from the above-mentioned functional block. The operation of each block constituting the control unit 55 will be described in detail later.

The mobile device 50 may have a moving function. For example, the mobile device 50 may have a power unit such as an engine and can move by its own power. The mobile device 50 does not necessarily have to have a moving function. In this case, the mobile device 50 may be a device that is retrofitted to a device (for example, a vehicle such as an automobile) having a moving function. For example, the mobile device 50 may be a navigation system device retrofitted to the automobile.

3. OPERATION OF INFORMATION PROCESSING SYSTEM

Next, the operation of the information processing system 1 will be described.

<3-1. Determination Process of Enabling/Disabling of HARQ Feedback>

As mentioned above, the information processing device of the present embodiment determines whether to enable the HARQ feedback in the sidelink communication based on the information about the sidelink communication. Here, the information about the sidelink communication may be, for example, information indicating the degree of congestion of communication such as a channel busy ratio (CBR). In the following description, information about sidelink communication is referred to as sidelink information. The sidelink information is not limited to the information indicating the degree of congestion of communication. The sidelink information will be described in detail later in <3-3. Information used for determination>.

Figure 17:
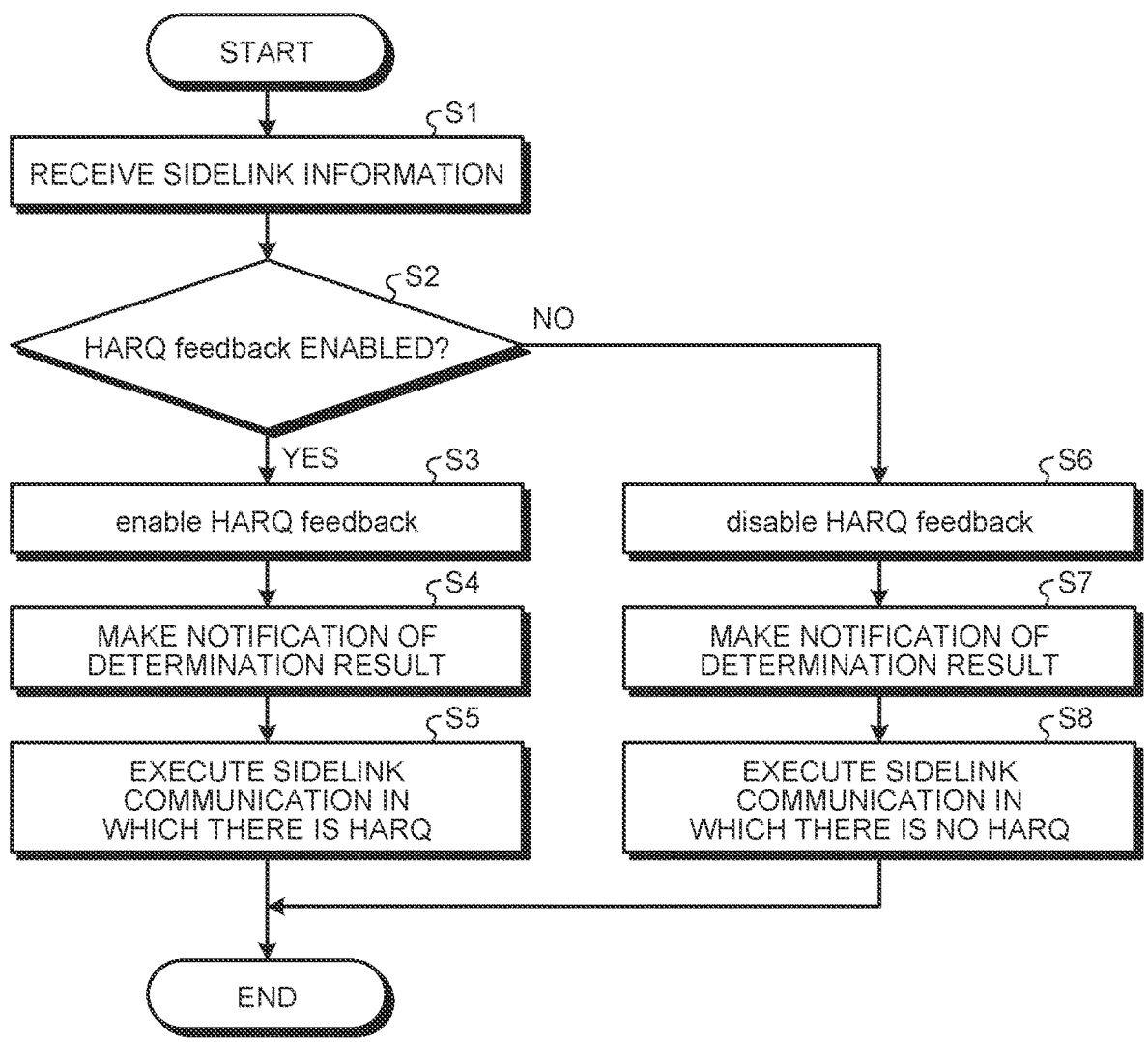
FIG. 17 is a flowchart illustrating a determination process according to the embodiment of the present disclosure.

FIG. 17 is a flowchart illustrating a determination process according to the embodiment of the present disclosure. The determination process illustrated in FIG. 17 is a process for determining whether to enable the HARQ feedback in the sidelink communication.

The information processing device that is the execution entity of the determination process is typically a communication device of the data transmitter of the sidelink communication (hereinafter referred to as a transmitting device). However, the execution entity of the determination process does not necessarily have to be the transmitting device. For example, the information processing device that is the execution entity of the determination process may be a communication device of the data receiver of the sidelink communication (hereinafter, referred to as a receiving device). Here, the communication device (transmitting device and receiving device) may be the terminal device 40 or the mobile device 50. Of course, the communication device (transmitting device and receiving device) may be the base station device 30.

Further, the information processing device that is the execution entity of the determination process may be a base station device capable of radio communicating with a plurality of communication devices (transmitting device and/or receiving device) that executes sidelink communication. At this time, the base station device may be the base station device 20.

Further, the information processing device that is the execution entity of the determination process may be a master communication device (also referred to as a master UE). The master communication device may be a communication device that controls, via the sidelink communication, sidelink communication performed between other communication devices. Here, the master communication device may be the terminal device 40 or the mobile device 50. Of course, the master communication device may be the base station device 30. The master communication device can be rephrased as a device other than the transmission device that schedules the resource for sidelink communication of the transmission device. At this time, the master communication device may be a UE type RSU (for example, the base station device 30).

In the following explanation, a communication device (transmitting device and receiving device) whose sidelink communication is controlled by the master communication device may be referred to as a slave communication device (or slave UE). The slave communication device may be the terminal device 40, the mobile device 50, or the base station device 30.

In addition, the information processing device that is the execution entity of the determination process may be the management device 10. The execution entity of the determination process will be described in detail later in <3-2. Execution entity of determination process>. In the description of the determination process illustrated below, although the execution entity of the determination process is assumed to be the mobile device 50, the execution entity of the determination process can be replaced with another device (for example, the management device 10, the base station device 20, the base station device 30, and the terminal device 40). For example, the description of "mobile device 50"

appearing in the following description can be replaced with "management device 10", "base station device 20", "base station device 30", "terminal device 40", or the like.

In this case, the description of "acquisition unit 551" is appropriately replaced with "acquisition unit 241", "acquisition unit 341", "acquisition unit 451", and the like. Further, the description of "determination unit 552" is appropriately replaced with "determination unit 242", "determination unit 342", "determination unit 452", and the like. Further, the description of "notification unit 553" is appropriately replaced with "notification unit 243", "notification unit 343", "notification unit 453", and the like. Further, the description of "communication control unit 554" is appropriately replaced with "communication control unit 244", "communication control unit 344", "communication control unit 454", and the like. Further, the description of "radio communication unit 41" is appropriately replaced with "radio communication unit 21", "radio communication unit 31", "radio communication unit 41", and the like. The description of "storage unit 42" is appropriately replaced with "storage unit 22", "storage unit 32", "storage unit 42", and the like. Hereinafter, the determination process will be described with reference to FIG. 17.

First, the acquisition unit 551 of the mobile device 50 acquires the sidelink information (step S1). The acquisition unit 551 may receive the sidelink information from another device. When the sidelink information is already stored in the storage unit 52, the acquisition unit 551 may acquire the sidelink information from the storage unit 52. As described above, the sidelink information is information about sidelink communication. Of course, the sidelink information is not limited to the information indicating the degree of congestion of communication. The sidelink information will be described in detail later in <3-3. Information used for determination>.

Next, the determination unit 552 of the mobile device 50 determines whether to enable or disable the HARQ feedback (step S2). At this time, the determination unit 552 determines whether to enable or disable the HARQ feedback based on the sidelink information acquired in step S1. The process of step S2 will be described in detail later in <3-3. Information used for determination>.

When the HARQ feedback is enabled (step S2: Yes), the communication control unit 554 of the mobile device 50 sets the HARQ feedback to enabled (step S3). Then, the notification unit 553 of the mobile device 50 notifies another device (for example, the receiving device) of the determination result (step S4). When the mobile device 50 (the execution entity of the determination process) is the receiving device, the notification unit 553 does not necessarily have to notify another device (for example, the transmitting device) of the determination result. The notification of the determination result will be described in detail later in <3-4. Notification of determination result>.

Then, the communication control unit 554 of the mobile device 50 controls the radio communication unit 51 to execute sidelink communication with the HARQ feedback (step S5). For example, when the mobile device 50 (the execution entity of the determination process) is the transmitting device, it retransmits the data when the NACK (negative response) is replied as the HARQ feedback from the receiving device while transmitting the data to the receiving device.

When the mobile device 50 (the execution entity of the determination process) is the receiving device, the communication control unit 554 executes the HARQ feedback when data is received via sidelink communication. For example, the communication control unit 554 replies an ACK (positive response) as the HARQ feedback when the received data has no error, and replies a NACK (negative response) as the HARQ feedback when the received data has an error.

When the mobile device 50 (execution entity of the determination process) is a base station device or a master communication device, it may perform control of the sidelink communication, allocation of the retransmission resource, and the like. The execution of the sidelink communication will be described in detail later in <3-5. Execution of sidelink communication after determination>. The data repeat process when the HARQ feedback is enabled will be described in detail later in <3-6. HARQ feedback mode>.

On the other hand, when the HARQ feedback is disabled (step S2: No), the communication control unit 554 of the mobile device 50 sets the HARQ feedback to disable (step S6). Then, the notification unit 553 of the mobile device 50 notifies another device (for example, the receiving device) of the determination result (step S7). When the mobile device 50 (the execution entity of the determination process) is the receiving device, the notification unit 553 does not necessarily have to notify another device (for example, the transmitting device) of the determination result. The notification of the determination result will be described in detail later in <3-4. Notification of determination result>.

Then, the communication control unit 554 of the mobile device 50 controls the radio communication unit 51 to execute sidelink communication without the HARQ feedback (step S8). For example, when the mobile device 50 (the execution entity of the determination process) is the transmitting device, the data is repeatedly transmitted (repetition) to the receiving device. Of course, sidelink communication without the HARQ feedback is not limited to repeated transmission.

When the mobile device 50 (the execution entity of the determination process) is the receiving device, the communication control unit 554 does not execute the HARQ feedback when data is received via sidelink communication. At this time, when there is an error in the received data, the communication control unit 554 may correct the error based on the repeatedly transmitted data. The execution of the sidelink communication will be described in detail later in <3-5. Execution of sidelink communication after determination>.

When the sidelink communication is completed, the mobile device 50 ends the determination process.

<3-2. Execution Entity of Determination Process>

Next, the execution entity of the determination process (determination entity of enabling/disabling of the HARQ feedback) will be described. The execution entity of the determination process is divided into the following (a) to (d).

(a) Transmitting device
(b) Receiving device
(c) Base station device
(d) Master communication device Hereinafter, each of (a) to (d) will be described.

(a) Transmitting Device

When the transmitting device determines whether to enable or disable the HARQ feedback, the transmitting device may notify the receiving device of the determination result semi-statically or dynamically. The semi-static notification is a notification of enabling/disabling of the HARQ feedback for a plurality of sidelink communication, for example, for a predetermined period or a predetermined number of times. Further, the dynamic notification is a notification of enabling/disabling of the HARQ feedback for each sidelink communication. In the case of semi-static notification, the transmitting device may instruct the receiving device to enable/disable the HARQ feedback using, for example, a channel such as a physical sidelink control channel (PSCCH), a physical sidelink feedback channel (PSFCH), or a physical sidelink shared channel (PSSCH). In the case of semi-static notification, the transmitting device may instruct the receiving device to enable/disable the HARQ feedback for each sidelink communication using sidelink communication.

(b) Receiving Device

When the receiving device determines whether to enable or disable the HARQ feedback, the receiving device may notify the transmitting device of the determination result. For example, the receiving device uses a channel such as a PSCCH, a PSFCH, or a PSSCH to make a notification of "information indicating whether to transmit the HARQ feedback when data is received via sidelink communication next time". Alternatively, the receiving device may include "information about whether to transmit the HARQ feedback when data is received via the sidelink communication next time" in the transmission packet of the sidelink communication.

(c) Base Station Device

When the base station device determines whether to enable or disable the HARQ feedback, the base station device may notify the receiving device and/or the transmitting device of the determination result semi-statically, or dynamically. For example, notification of the determination result may be made using radio communication between the base station and the terminal such as the RRC, the system information block (SIB), the PDCCH, and the PBCH.

(d) Master Communication Device

When the master communication device determines whether to enable or disable the HARQ feedback, the master communication device may notify the receiving device and/or the transmitting device of the determination result semi-statically, or dynamically. Notification of the determination result may be made using sidelink communication.

<3-3. Information Used for Determination>

Next, the information (sidelink information) used for determining whether to enable/disable the HARQ feedback and the determination of whether enable/disable the HARQ feedback will be described. The following (A) to (J) can be assumed as the sidelink information.

(A) Position information and/or distance information
(B) Reliability request and/or delay request information
(C) Information about another receiving device whose feedback is enabled
(D) Congestion degree information
(E) Traffic information
(F) Communication method information
(G) Retransmission resource determiner information
(H) Resource pool information
(I) The number of receiving devices
(J) Service type information Hereinafter, each of (A) to (J) will be described. The description of the "information processing device" that appears in the following description can be replaced with "management device 10", "base station device 20", "base station device 30", "terminal device 40", or "mobile device 50".

(A) Position Information and/or Distance Information

As the sidelink information, position information and/or distance information is assumed. Here, the position information is information indicating the position of the communication device that performs sidelink communication. The position information may be a position in a cell formed by the base station device (for example, information about a direction and a distance with respect to the base station device), or may be information about latitude and longitude. Further, the distance information is information indicating the distance between communication devices that perform sidelink communication. For example, the distance information is the distance between the transmitting device and the receiving device.

For example, it is assumed that the sidelink information is distance information. In this case, the information processing device may determine to enable the HARQ feedback when the distance between the communication devices that perform sidelink communication is smaller than a predetermined distance. On the other hand, the information processing device may determine to disable the HARQ feedback when the distance between the communication devices that perform sidelink communication is larger than a predetermined distance. In this case, the transmitting device may perform sidelink communication using a communication method other than the communication method using the HARQ, such as repetition. When there is a distance between the transmitting device and the receiving device, communication is prone to fail, but the HARQ feedback is not performed in such a case, so that high communication performance (for example, low communication delay) is maintained.

Further, it is assumed that the sidelink information is the position information indicating the position of the receiving device. Further, it is assumed that the receiving device is configured to be able to provide the HARQ feedback to the transmitting device via the base station device. In this case, the information processing device may determine whether the receiving device is located within the coverage (for example, within the range of the cell formed by the base station device) of the base station device based on the position information. When the receiving device is located within the coverage of the base station device, the information processing device may determine to enable the HARQ feedback via the base station device of the receiving device. At this time, the information processing device may determine that the receiving device disables the direct HARQ feedback from the receiving device to the transmitting device using the sidelink communication. On the other hand, when the receiving device is located outside the coverage of the base station device, it may determine to disable the HARQ feedback via the base station device of the receiving device. At this time, the information processing device may determine that the receiving device enables the direct HARQ feedback from the receiving device to the transmitting device using sidelink communication. When the receiving device is not within the coverage of the base station device, the HARQ feedback via the base station device is not performed, so that the radio resource is not wasted.

(B) Reliability Request and/or Delay Request Information

As another example of sidelink information, reliability request and/or delay request information is assumed. Here, the reliability request information is information about the reliability request to the transmission data of the sidelink communication. Further, the reliability request information is information about the delay request to the transmission data of the sidelink communication. The reliability request and/or delay request information may be information about the QoS requirement of the transmitted packet.

For example, it is assumed that the sidelink information is information of the delay request. In this case, when the delay request requires a low delay equal to or more than a predetermined reference (when the delay request is strict), the information processing device may disable the HARQ feedback since it may take too long a time for processing of the HARQ and retransmission and may not meet the requirement. On the other hand, when the delay request does not require a low delay equal to or more than a predetermined reference (when the delay request is loose), the information processing device may enable the HARQ feedback.

Further, it is assumed that the sidelink information is the information of the reliability request. In this case, when the reliability request requires reliability equal to or higher than a predetermined reference (when the reliability request is strict), the information processing device may enable the HARQ feedback. On the other hand, when the reliability request does not require reliability equal to or higher than a predetermined reference (when the reliability request is loose), the information processing device may disable the HARQ feedback.

(C) Information about Another Receiving Device Whose Feedback is Enabled

As another example of the sidelink information, the information of another receiving device whose HARQ feedback is enabled is assumed. For example, suppose a transmitting device performs sidelink communication with a plurality of receiving devices (for example, a first communication device and a second communication device). Further, it is assumed that another receiving device whose feedback is enabled is located near a certain receiving device (first communication device). At this time, when the positions of the plurality of receiving devices are close to each other, it is considered that the reception status (whether the reception succeeds or fails) does not almost change. In this case, the transmitting device does not need to have all receiving devices transmit the HARQ feedback.

Therefore, the information processing device acquires, as sidelink information, information indicating whether another receiving device whose HARQ feedback is enabled is located within a predetermined range of the first communication device serving as the receiving device for sidelink communication. The information processing device determines whether to enable the feedback of the first communication device based on the information about whether another receiving device whose HARQ feedback is enabled is located within a predetermined range.

For example, when another receiving device whose HARQ feedback is enabled is not located within a predetermined range, the information processing device may determine to enable the HARQ feedback of the first communication device. On the other hand, when another receiving device whose HARQ feedback is enabled is located within a predetermined range, it may determine to disable the HARQ feedback of the first communication device.

At this time, the information processing device may determine whether to execute data retransmission to the first communication device based on the HARQ feedback of another receiving device. For example, it is assumed that the transmitting device executes sidelink transmission to another communication device in addition to the first communication device. At this time, when the HARQ feedback of another receiving device is the ACK, there is a high possibility that the data has been transmitted to the first communication device without any problem. Therefore, when the HARQ feedback of another receiving device is the ACK, the information processing device does not retransmit the data to the first communication device in order not to waste the radio resource. On the other hand, when the HARQ feedback of another receiving device is the NACK, there is a high possibility that the data transmission to the first communication device fails. Therefore, when the HARQ feedback of another receiving device is the NACK, the information processing device retransmits the data to the first communication device in order to improve the reliability of the communication.

Alternatively, the information processing device may determine, based on the HARQ feedback of another receiving device, the data transmission method used for data transmission to the first communication device from a plurality of data transmission methods. For example, it is assumed that the transmitting device executes sidelink transmission with another communication device prior to the sidelink communication with the first communication device. At this time, when the HARQ feedback of another receiving device is the ACK, there is a high possibility that the data is transmitted to the first communication device without any problem. Therefore, the information processing device executes non-repeated transmission in order not to waste the radio resource. On the other hand, when the HARQ feedback of another receiving device is the NACK, there is a high possibility that the data transmission to the first communication device fails. Therefore, when the HARQ feedback of another receiving device is the NACK, the information processing device executes repeated transmission in order to improve the reliability of communication.

(D) Congestion Degree Information

As another example of sidelink information, congestion degree information is assumed. The congestion degree information is information indicating the degree of congestion of the radio resource used for the sidelink communication. For example, the congestion degree information is a channel busy ratio (CBR). When the channel is busy, it is difficult to secure the resource for the HARQ feedback. Even when the receiving device executes the HARQ feedback, there is a possibility that the HARQ feedback cannot be read due to a collision with another sidelink communication. Therefore, in order not to waste radio resources, the HARQ feedback is disabled when the channel used for the sidelink communication is congested.

For example, the information processing device acquires, as sidelink information, information indicating the degree of congestion of the radio resource used for the sidelink communication. Then, the information processing device determines whether to enable the HARQ feedback based on the information indicating the degree of congestion. For example, when the degree of congestion is less than a predetermined threshold value, the information processing device enables the HARQ feedback. On the other hand, when the degree of congestion is equal to or higher than a predetermined threshold value, the information processing device disables the HARQ feedback.

(E) Traffic Information

As another example of sidelink information, traffic information is assumed. The traffic information is information about traffic of the sidelink communication. Traffic is, for example, the amount of data transmitted on a channel within a certain period of time. Alternatively, the traffic is related to the transmission timing of the terminal. For example, the information processing device disables the HARQ feedback when the transmission/reception of sidelink data is significantly affected.

For example, the information processing device acquires information about the traffic of the sidelink communication as sidelink information. For example, the information processing device acquires the result (for example, the amount of data) of communication of the HARQ feedback for a certain period between the transmitting device and the receiving device. Then, the information processing device determines whether to enable feedback based on the information about the traffic. For example, even though sidelink communication has not been completed, when the amount of data per predetermined period (for example, 1 second) of communication of the HARQ feedback changes beyond a predetermined threshold value, the communication environment may have changed significantly, so that the information processing device enables or disables the HARQ feedback. For example, the HARQ feedback is enabled when the amount of data per predetermined period exceeds a predetermined threshold value. On the other hand, when the amount of data per predetermined period is smaller than the predetermined threshold value, the HARQ feedback is disabled. For example, transmission/reception timing depends on the traffic. When the HARQ transmission/reception timing and the data transmission/reception timing overlap, only one of the HARQ and the data can be transmitted/received. That is, when there are many transmission/reception timings, the HARQ feedback is disabled. Conversely, the HARQ feedback is enabled when the timing of transmission and reception is short.

(F) Communication Method Information

As another example of the sidelink information, communication method information is assumed. Here, the communication method information is information for identifying the communication method of the sidelink communication. For example, the communication method information is information for identifying which of a plurality of communication methods including at least one of a broadcast, a multicast, and a unicast the communication method used for the sidelink communication is.

In this case, the information processing device may acquire, as sidelink information, information for identifying which of a plurality of communication methods including at least one of a broadcast, a multicast, and a unicast the communication method used for the sidelink communication is. Then, the information processing device may determine whether to enable the HARQ feedback based on the information for specifying the communication method of the sidelink communication.

For example, the information processing device may acquire, as sidelink information, information for identifying which of a plurality of communication methods including at least a broadcast the communication method used for the sidelink communication is. Then, the information processing device may determine to disable the HARQ feedback when the communication method used for the sidelink communication is a broadcast. When the communication method is a broadcast, it may be difficult for the transmitting device to respond to the HARQ feedback of each receiving device because it deals with many receiving devices. Further, when the data is individually retransmitted to the receiving device, a large amount of radio resource is consumed. Therefore, by disabling the HARQ feedback in advance, it is possible to prevent resources such as a CPU resource and a radio resource from being wasted due to the HARQ.

When the communication method is a multicast or a unicast, the HARQ feedback may be enabled because the number of communication partners is limited.

For example, the information processing device may acquire, as sidelink information, information for identifying which of a plurality of communication methods including at least a multicast the communication method used for the sidelink communication is. Then, the information processing device may determine to enable the HARQ feedback when the communication method used for the sidelink communication is a multicast.

Alternatively, the information processing device may acquire, as sidelink information, information for identifying which of a plurality of communication methods including at least a unicast the communication method used for the sidelink communication is. Then, the information processing device may determine to enable the HARQ feedback when the communication method used for the sidelink communication is a unicast.

(G) Retransmission Resource Determiner Information

As another example of the sidelink information, information for identifying which device is the device (device to be allocated) that determines the radio resource for data retransmission is assumed.

For example, the information processing device may acquire, as sidelink information, information for identifying which device the device that determines the radio resource for data retransmission is. Then, the information processing device may determine whether to enable feedback based on the information for identifying the device that determines the radio resource for data retransmission.

At this time, when the device that determines the radio resource for data retransmission is a base station device, the information processing device may determine to disable the direct feedback from the receiving device to the transmitting device of the sidelink communication, and enable the HARQ feedback from the receiving device to the base station device.

Alternatively, when the device that determines the radio resource for data retransmission is a master communication device, the information processing device determines to disable the direct HARQ feedback from the receiving device (one of the slave communication devices) to the transmitting device (the other of the slave communication devices) of the sidelink communication, and determines to enable the feedback from the receiving device (one of the slave communication devices) to the master communication device.

The device that determines the radio resource for data retransmission will be described in detail later in <3-6. HARQ feedback mode>.

(H) Resource Pool Information

As another example of sidelink information, resource pool information is assumed. The resource pool information is information about the resource pool of the radio resource used for the sidelink communication.

For example, the information processing device may acquire, as sidelink information, information about a resource pool of the radio resource used for the sidelink communication. The information processing device may determine whether to enable the feedback based on determining whether to enable the feedback and based on the information about the resource pool. For example, the information processing device disables the HARQ feedback for sidelink communication using the resource of a pool that does not provide the HARQ feedback and/or a pool that does not support the HARQ feedback. For example, the information processing device disables the HARQ feedback for the sidelink communication using a resource pool dedicated to a sidelink broadcast.

(I) The Number of Receiving Devices

As another example of the sidelink information, information indicating the number of receiving devices is assumed. For example, in the multicast, it is assumed that the number of receiving devices will increase. When the number of receiving devices is large, it is assumed that it will be difficult to handle the HARQ feedback as in the case of a broadcast. Therefore, the information processing device enables or disables the HARQ feedback according to the number of receiving devices.

For example, the information processing device may acquire, as sidelink information, information indicating the number of receiving devices for sidelink communication. Then, the information processing device may determine whether to enable the HARQ feedback based on the information indicating the number of the receiving devices. At this time, the information processing device may determine to disable the HARQ feedback when the number of receiving devices is larger than a predetermined number. On the other hand, the information processing device may determine to enable the HARQ feedback when the number of receiving devices is less than a predetermined number.

(J) Service Type Information

As another example of sidelink information, service type information is assumed. The service type information is information indicating the type of communication service executed by using the sidelink communication. For example, service type information is information for identifying which of a plurality of types including at least one of an eMBB, an mMTC, and a URLLC the type of communication service executed using the sidelink communication is.

For example, the information processing device may acquire, as sidelink information, information indicating the type of communication service executed by using the sidelink communication. The information processing device may then determine whether to enable feedback based on the information indicating the type of communication service. In the URLLC, the delay requirement is strict. Therefore, the information processing device may determine to disable the HARQ feedback when the type of communication service executed using sidelink communication is the URLLC.

In the 5G, the concept of network slicing (hereinafter referred to as network slice) is introduced to provide a communication service optimized for various communication characteristics according to use cases. Therefore, the type of communication service may be determined based on the network slice identification information, for example, a slice ID. Where the slice ID may be, for example, single network slice selection assistance information (S-NSSAI).

<3-4. Notification of Determination Result>

Next, the notification of the determination result will be described. The notification aspect of the determination result differs depending on which device the execution entity of the determination process (determination entity of enabling/disabling of the HARQ feedback) is. As described above, the execution entity of the determination process is divided into the following (a) to (d).

(a) Transmitting device
(b) Receiving device
(c) Base station device
(d) Master communication device Hereinafter, the notification process of the determination result for each execution entity of the determination process will be described.

(a) Transmitting Device

Figure 18:
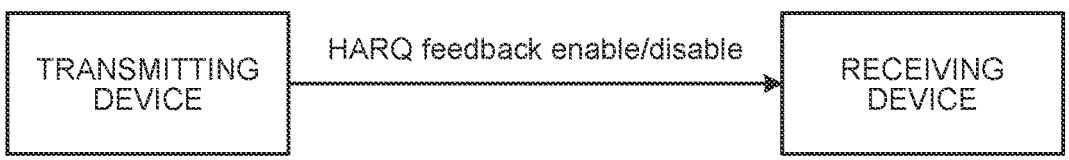
FIG. 18 is a diagram illustrating a notification process of a determination result when a transmitting device determines enabling/disabling of HARQ feedback.

FIG. 18 is a diagram illustrating notification process of the determination result when the transmitting device determines whether to enable or disable the HARQ feedback. In this case, the transmitting device notifies the receiving device of the determination result using the sidelink communication. The means for notification is, for example, the PSCCH, the PSSCH, or the PFSCH.

(b) Receiving Device

Figure 19:
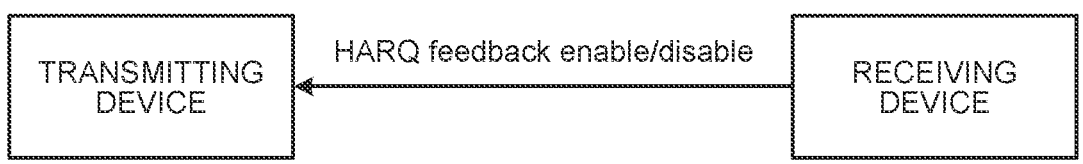
FIG. 19 is a diagram illustrating a notification process of a determination result when a receiving device determines enabling/disabling of HARQ feedback.

FIG. 19 is a diagram illustrating notification process of the determination result when the receiving device determines whether to enable or disable the HARQ feedback. In this case, the receiving device notifies the transmitting device of the determination result using the sidelink communication. The means for notification is, for example, the PSCCH, the PSSCH, or the PFSCH.

(c) Base Station Device

Figure 20:
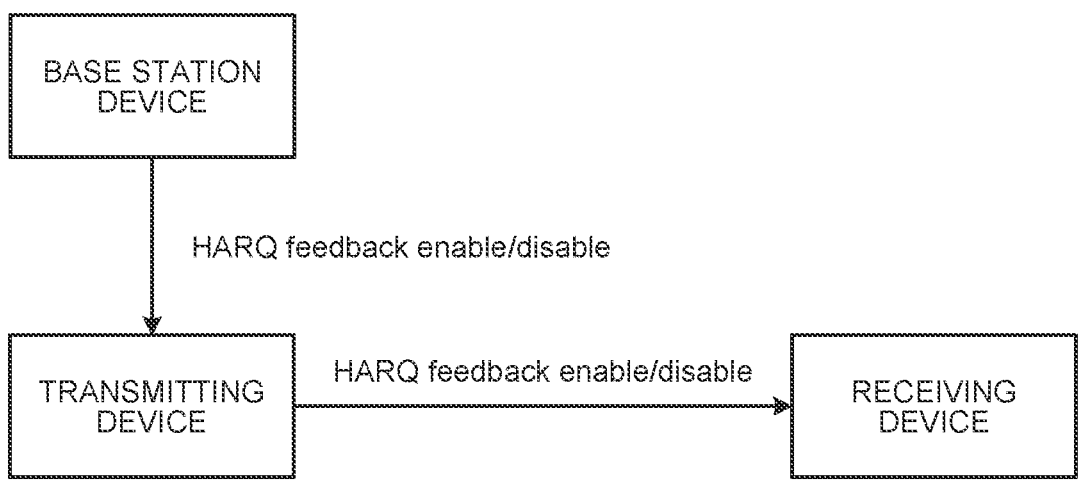
FIG. 20 is a diagram illustrating a notification process of a determination result when a base station device determines enabling/disabling of HARQ feedback.
Figure 21:
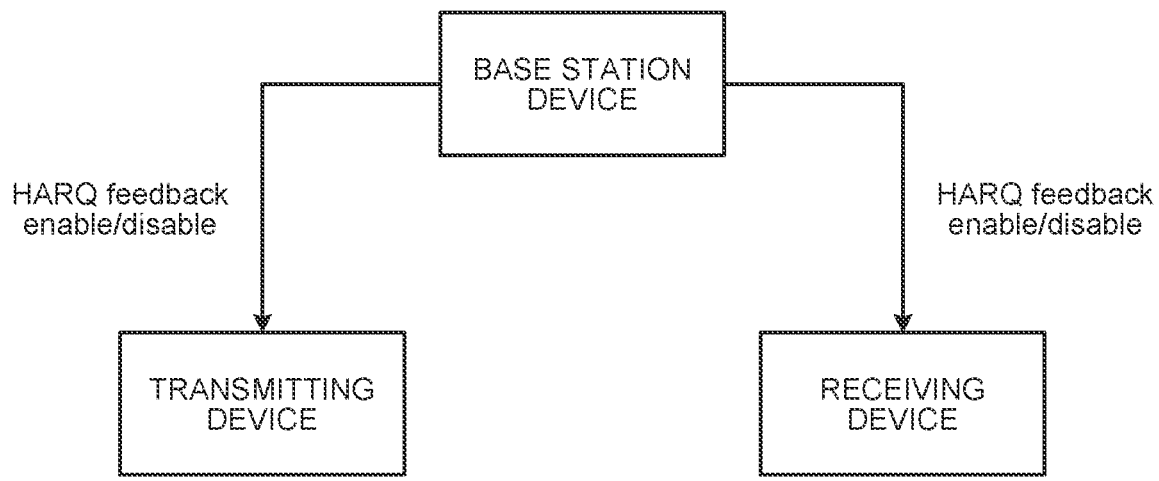
FIG. 21 is a diagram illustrating a notification process of a determination result when a base station device determines enabling/disabling of HARQ feedback.

FIGS. 20 and 21 are diagrams illustrating notification process of the determination result when the base station device determines whether to enable or disable the HARQ feedback.

In the example of FIG. 20, the base station device first notifies the transmitting device of the determination result. The means for notification is, for example, the RRC, the SIB, the PBCH, the PDCCH, or the PDSCH. After that, the transmitting device notifies the receiving device of the enabling/disabling of the HARQ feedback. The means for notification is, for example, the PSCCH, the PSSCH, or the PFSCH.

In the example of FIG. 21, the base station device notifies both the transmitting device and the receiving device of the determination result. The means for notification is, for example, the RRC, the SIB, the PBCH, the PDCCH, or the PDSCH.

(d) Master Communication Device

Figure 22:
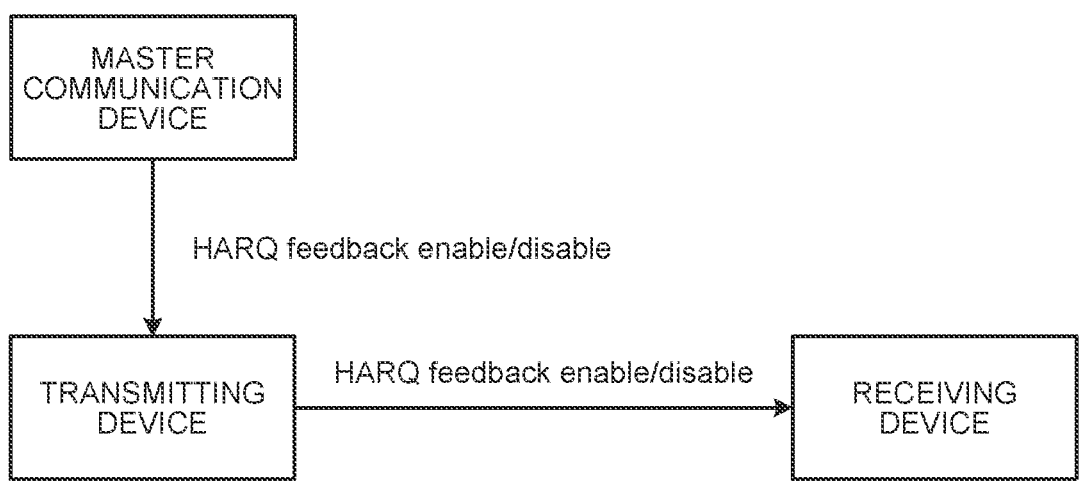
FIG. 22 is a diagram illustrating a notification process of a determination result when a master communication device determines enabling/disabling of HARQ feedback.
Figure 23:
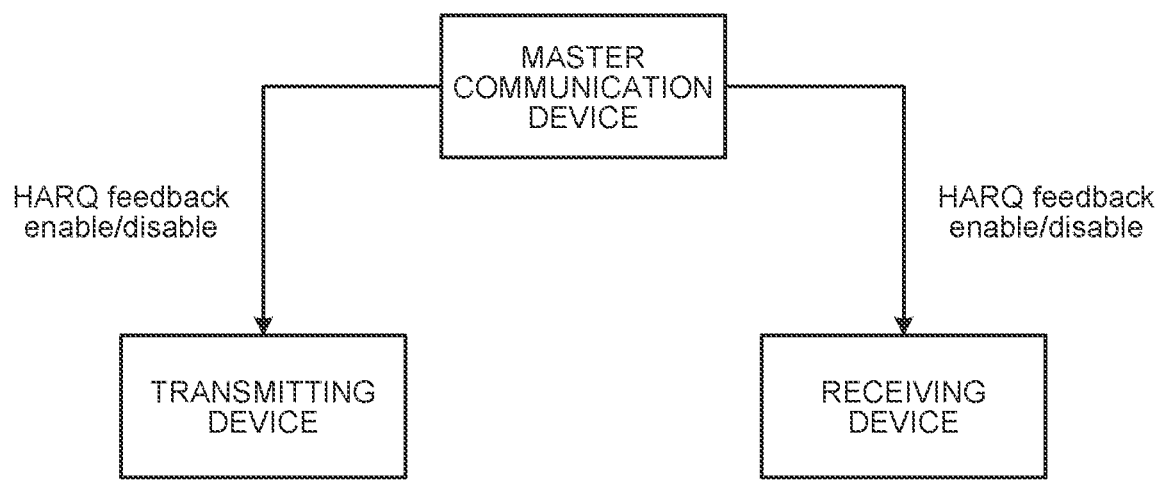
FIG. 23 is a diagram illustrating a notification process of a determination result when a master communication device determines enabling/disabling of HARQ feedback.

FIGS. 22 and 23 are diagrams illustrating the notification process of the determination result when the master communication device determines whether to enable or disable the HARQ feedback.

In the example of FIG. 22, the master communication device first notifies the transmitting device of the determination result. The means for notification is, for example, the PSCCH, the PSSCH, or the PFSCH. After that, the transmitting device notifies the receiving device of the enabling/disabling of the HARQ feedback. The means for notification is, for example, the PSCCH, the PSSCH, or the PFSCH.

In the example of FIG. 23, the master communication device notifies both the transmitting device and the receiving device of the determination result. The means for notification is, for example, the PSCCH, the PSSCH, or the PFSCH.

<3-5. Execution of Sidelink Communication after Determination>

Next, the execution of the sidelink communication after determining enabling/disabling of the HARQ feedback. In the following description, the transmission operation of the transmitting device when the communication method is a unicast, a multicast, and a broadcast will be described.

(1) In the Case of Unicast

When the HARQ feedback is enabled, the transmitting device may perform sidelink transmission in which there is repetition, but it is desirable to perform sidelink communication in which there is no repetition. Effective use of the radio resource is realized by not performing repetition.

On the other hand, when the HARQ feedback is disabled, the transmitting device may perform sidelink communication in which there is no repetition, but it is desirable to perform sidelink transmission in which there is repetition. By performing sidelink transmission in which there is repetition, communication reliability can be maintained even when there is no HARQ feedback.

(2) In the Case of Multicast

When the HARQ feedback of all receiving devices that are the transmission targets is enabled, the transmitting device may perform sidelink transmission in which there is repetition, but it is desirable to perform sidelink communication in which there is no repetition. Effective use of the radio resource is realized by not performing repetition.

Also, when the HARQ feedback of all receiving devices that are transmission targets is disabled, the transmitting device may perform sidelink communication in which there is no repetition, but it is desirable to perform sidelink transmission in which there is repetition. By performing sidelink transmission in which there is repetition, communication reliability can be maintained even when there is no HARQ feedback.

In addition, when the HARQ feedback of some of the receiving devices that are the transmission targets is disabled, the following two patterns can be assumed.

(Pattern 1)

The transmitting device may perform sidelink communication in which there is no repetition, but it is desirable to perform repetition. By performing sidelink transmission in which there is repetition, communication reliability can be maintained even when there is no HARQ feedback.

(Pattern 2)

The transmitting device classifies the receiving device as the transmission target into a group of receiving devices (first group) that perform the HARQ feedback, and a group of receiving devices (second group) that do not perform the HARQ feedback. The transmitting device performs sidelink communication in which there is no repetition on the receiving devices of the first group, and sidelink communication in which there is repetition on the receiving devices of the second group. The radio resource is not wasted while maintaining communication reliability.

(3) In the Case of Broadcasting

Although it is desirable to disable the HARQ feedback, the transmitting device may perform the same the transmission process as in the case of the multicast.

<3-6. HARQ Feedback Mode>

It can be assumed that the HARQ includes a plurality of modes with different aspects from the HARQ feedback to data retransmission. Hereinafter, the plurality of modes is referred to as HARQ feedback modes. As mentioned below, the HARQ feedback mode is classified according to (X) the difference in the HARQ feedback route and (Y) the difference in the device (device to be allocated) that determines the radio resource for data retransmission.

(X) HARQ Feedback Route

The following three routes are assumed as the HARQ feedback route.

X1. The route where the HARQ feedback is transmitted from the receiving device to the transmitting device using sidelink communication.

X2. The route where the HARQ feedback is transmitted from the receiving device to the base station device using uplink communication.

X3. The route where the HARQ feedback is transmitted from the receiving device to the master device using sidelink communication.

(Y) Device that Determines the Radio Resource for Data Retransmission

The following three devices are assumed as a device that determines the radio resource for data retransmission. The radio resource for data retransmission is, for example, a resource specified by frequency and time.

Y1. Transmitting device

Y2. Base station

Y3. Master communication device

The following nine HARQ feedback modes can be considered according to the combination of (X) and (Y) above.

HARQ feedback mode 1 (X1+Y1)
HARQ feedback mode 2 (X1+Y2)
HARQ feedback mode 3 (X1+Y3)
HARQ feedback mode 4 (X2+Y1)
HARQ feedback mode 5 (X2+Y2)
HARQ feedback mode 6 (X3+Y1)
HARQ feedback mode 7 (X3+Y3)
HARQ feedback mode 8 (X2+Y2)
HARQ feedback mode 9 (X3+Y3)

Each of the above nine modes will be described below.

[HARQ Feedback Mode 1 (X1+Y1)]

Figure 24:
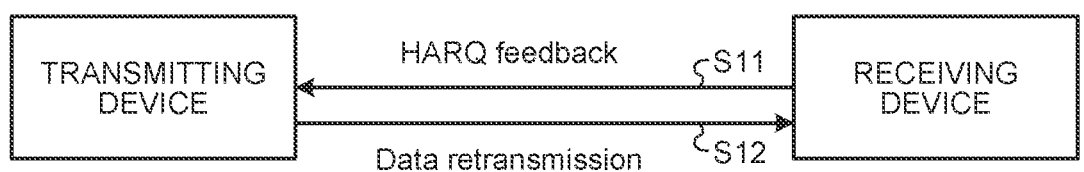
FIG. 24 is a diagram illustrating a data repeat process according to an HARQ feedback mode 1.

FIG. 24 is a diagram illustrating a data repeat process according to the HARQ feedback mode 1. First, the receiving device transmits the HARQ feedback to the transmitting device (step S11). Then, when the HARQ feedback is the NACK, the transmitting device retransmits the data to the receiving device (step S12). At this time, the transmitting device may determine the radio resource for data retransmission from the radio resources already held.

[HARQ Feedback Mode 2 (X1+Y2)]

Figure 25:
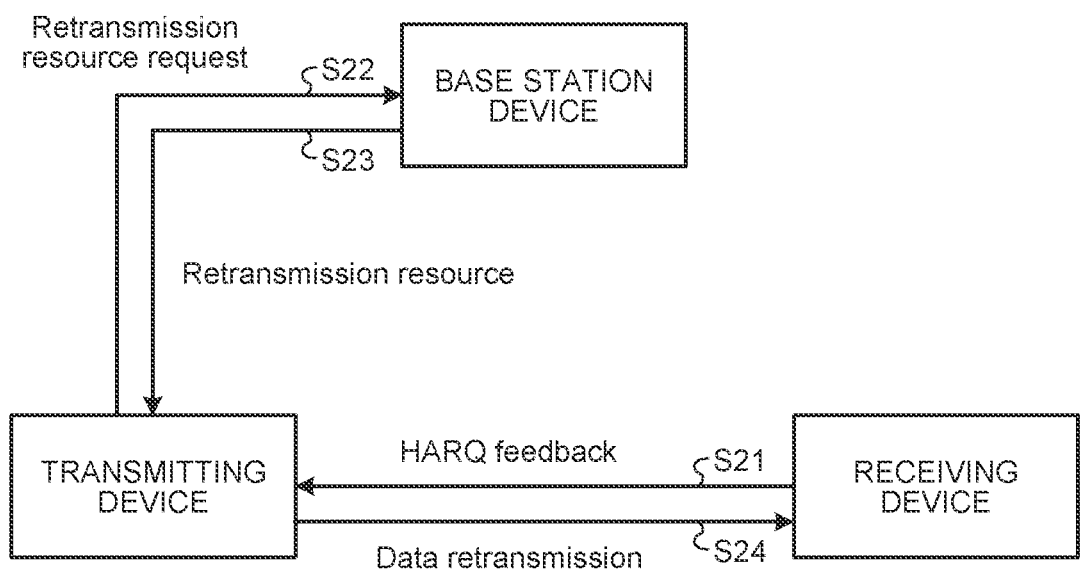
FIG. 25 is a diagram illustrating a data repeat process according to an HARQ feedback mode 2.

FIG. 25 is a diagram illustrating a data repeat process according to the HARQ feedback mode 2. First, the receiving device transmits the HARQ feedback to the transmitting device (step S21). Then, when the HARQ feedback is the NACK, the transmitting device requests a radio resource for data retransmission from the base station device (step S22). Then, the base station device allocates the radio resource for data retransmission to the transmitting device (step S23). After the radio resource for data retransmission is allocated, the transmitting device retransmits the data using the allocated radio resource (step S24). The radio resources are not wasted because the allocation of radio resources is under the control of the base station device.

[HARQ Feedback Mode 3 (X1+Y3)]

Figure 26:
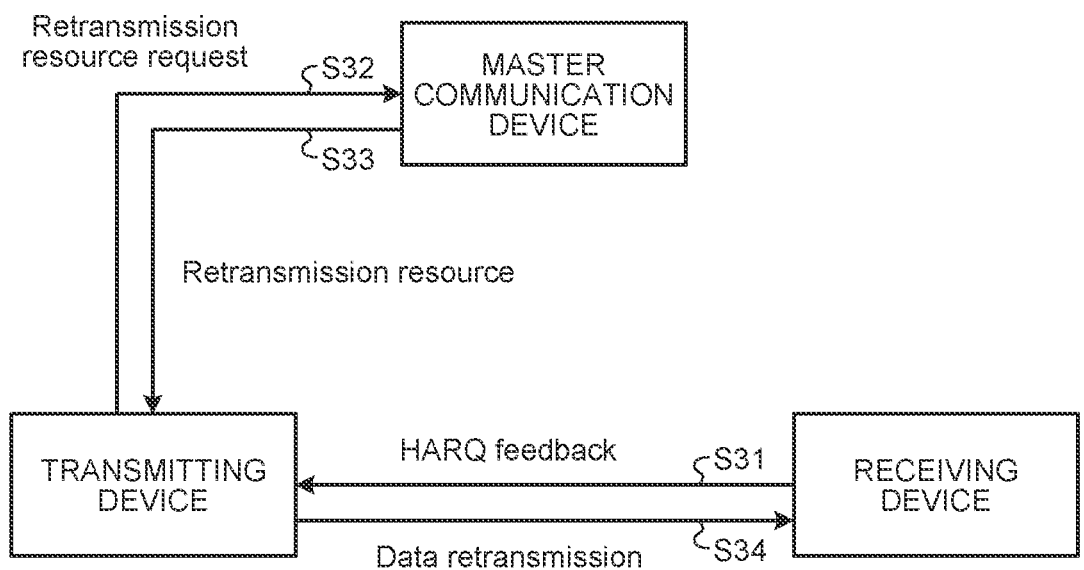
FIG. 26 is a diagram illustrating a data repeat process according to an HARQ feedback mode 3.

FIG. 26 is a diagram illustrating a data repeat process according to the HARQ feedback mode 3. First, the receiving device (slave communication device) transmits the HARQ feedback to the transmitting device (slave communication device) (step S31). Then, when the HARQ feedback is the NACK, the transmitting device requests a radio resource for data retransmission from the master communication device (step S32). Then, the master communication device allocates the radio resource for data retransmission to the transmitting device (step S33). When the radio resource for data retransmission is allocated, the transmitting device retransmits the data using the allocated radio resource (step S34). The radio resources are not wasted because the allocation of radio resources is under the control of the master communication device.

[HARQ Feedback Mode 4 (X2+Y1)]

Figure 27:
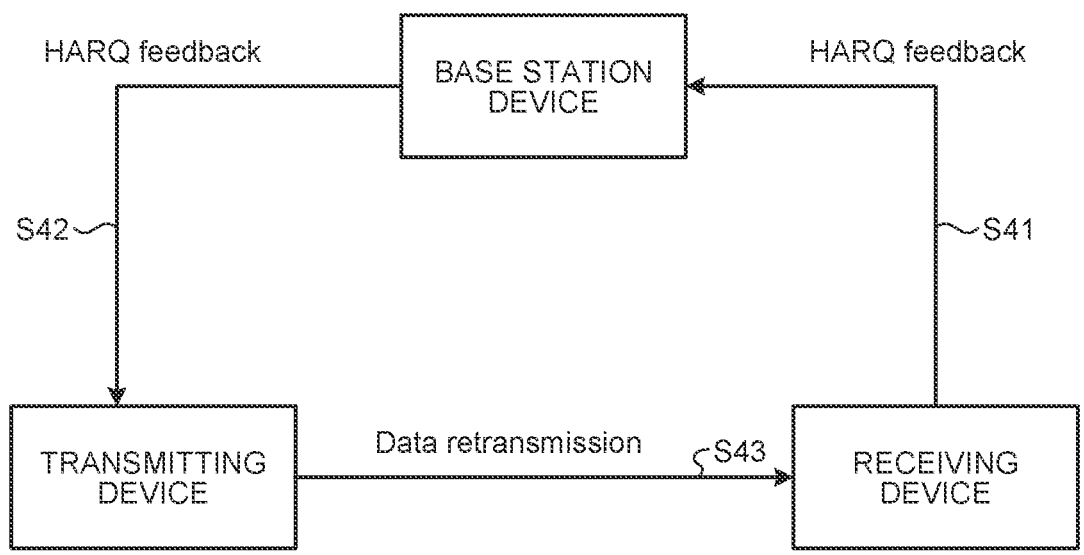
FIG. 27 is a diagram illustrating a data repeat process according to an HARQ feedback mode 4.

FIG. 27 is a diagram illustrating data repeat process according to the HARQ feedback mode 4. First, the receiving device transmits the HARQ feedback to the base station device (step S41). Then, the base station device transmits the HARQ feedback to the transmitting device (step S42). Then, when the HARQ feedback is the NACK, the transmitting device retransmits the data to the receiving device (step S43). At this time, the transmitting device may determine the radio resource for data retransmission from the radio resources already held. Since the HARQ feedback is transmitted via the base station device, it is possible to reduce the possibility that the HARQ feedback will not reach the transmitting device.

[HARQ Feedback Mode 5 (X2+Y2)]

Figure 28:
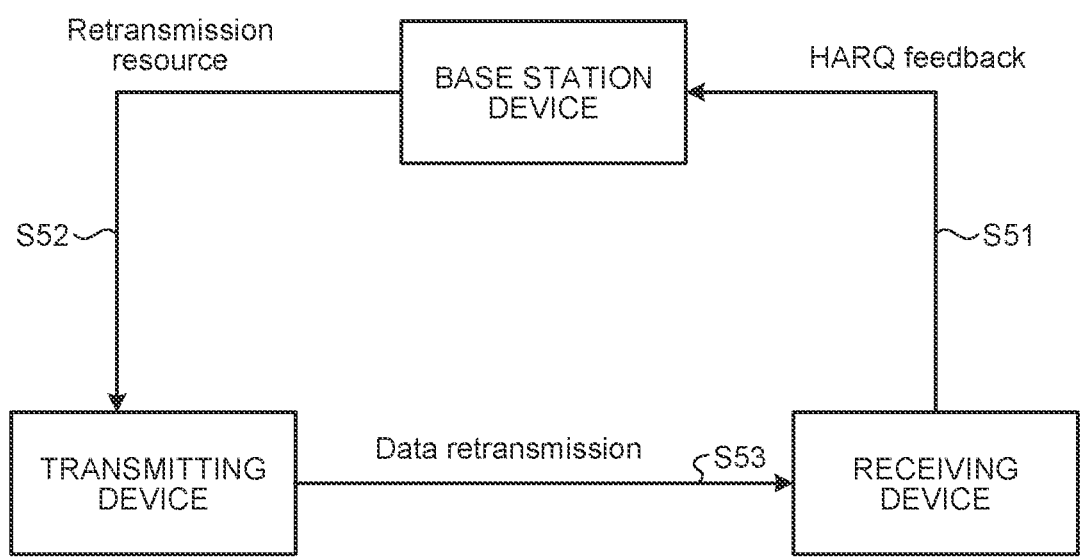
FIG. 28 is a diagram illustrating a data repeat process according to an HARQ feedback mode 5.

FIG. 28 is a diagram illustrating a data repeat process according to the HARQ feedback mode 5. First, the receiving device transmits the HARQ feedback to the base station device (step S51). When the HARQ feedback is the NACK, the base station device instructs the transmitting device to retransmit the data, and allocates a radio resource for data retransmission (step S52). Then, the transmitting device retransmits the data using the allocated radio resource (step S53). Since the base station device determines the retransmission, the process of the transmitting device can be simplified.

[HARQ Feedback Mode 6 (X3+Y1)]

Figure 29:
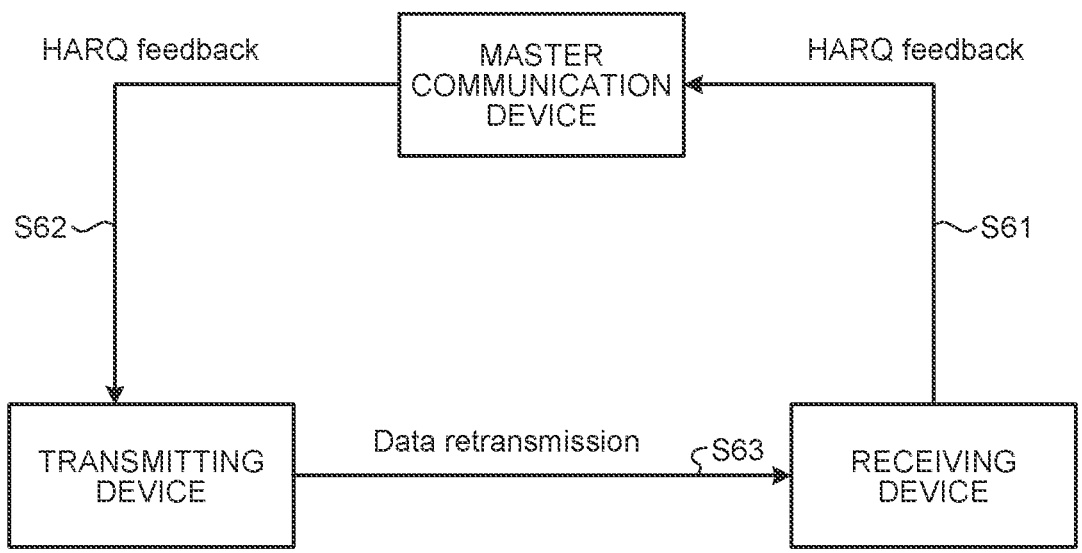
FIG. 29 is a diagram illustrating a data repeat process according to an HARQ feedback mode 6.

FIG. 29 is a diagram illustrating a data repeat process according to the HARQ feedback mode 6. First, the receiving device transmits the HARQ feedback to the master communication device (step S61). Then, the master communication device transmits the HARQ feedback to the transmitting device (step S62). Then, when the HARQ feedback is the NACK, the transmitting device retransmits the data to the receiving device (step S63). At this time, the transmitting device may determine the radio resource for data retransmission from the radio resources already held. Since the HARQ feedback is transmitted via the master communication device, it is possible to reduce the possibility that the HARQ feedback will not reach the transmitting device.

[HARQ Feedback Mode 7 (X3+Y3)]

Figure 30:
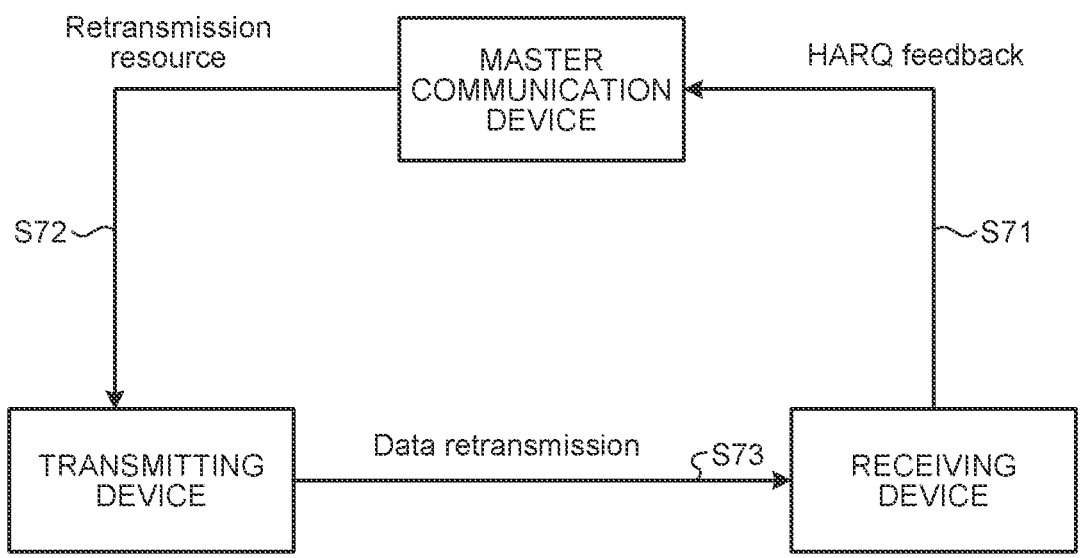
FIG. 30 is a diagram illustrating a data repeat process according to an HARQ feedback mode 7.

FIG. 30 is a diagram illustrating a data repeat process according to the HARQ feedback mode 7. First, the receiving device transmits the HARQ feedback to the master communication device (step S71). When the HARQ feedback is the NACK, the master communication device instructs the transmitting device to retransmit the data, and allocates the radio resource for data retransmission (step S72). Then, the transmitting device retransmits the data using the allocated radio resource (step S73). Since the master communication device determines the retransmission, the process of the transmitting device can be simplified.

[HARQ Feedback Mode 8 (X2+Y2)]

Figure 31:
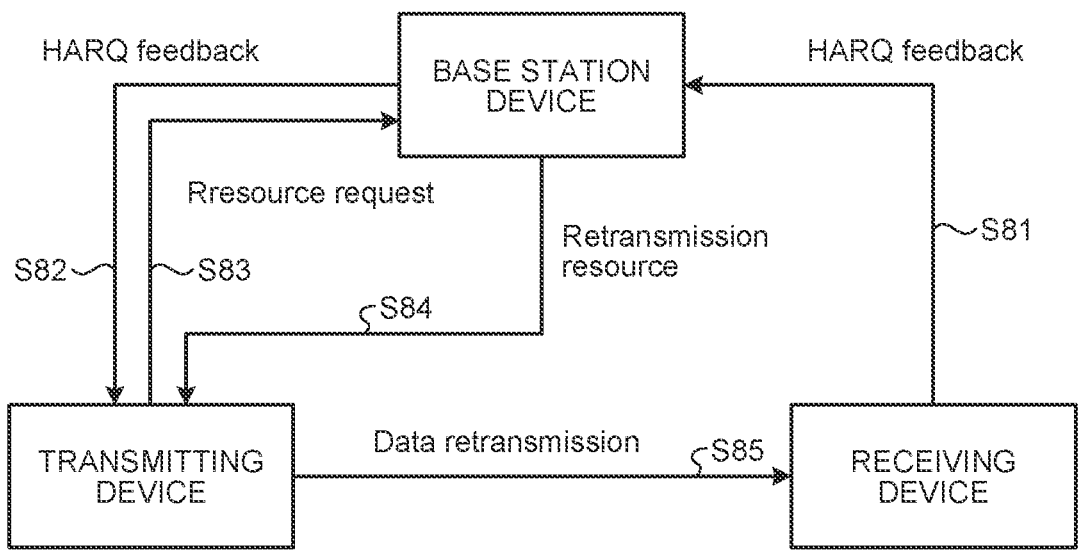
FIG. 31 is a diagram illustrating a data repeat process according to an HARQ feedback mode 8.

FIG. 31 is a diagram illustrating a data repeat process according to the HARQ feedback mode 8. First, the receiving device transmits the HARQ feedback to the base station device (step S81). Then, the base station device transmits the HARQ feedback to the transmitting device (step S82). Then, when the HARQ feedback is the NACK, the transmitting device requests a radio resource for data retransmission from the base station device (step S83). Then, the base station device allocates the radio resource for data retransmission to the transmitting device (step S84). After the radio resource for data retransmission is allocated, the transmitting device retransmits the data using the allocated radio resource (step S85). Since the HARQ feedback is transmitted via the base station device, it is possible to reduce the possibility that the HARQ feedback will not reach the transmitting device. Also, since the allocation of radio resources is under the control of the base station device, the radio resources are not wasted.

[HARQ Feedback Mode 9 (X3+Y3)]

Figure 32:
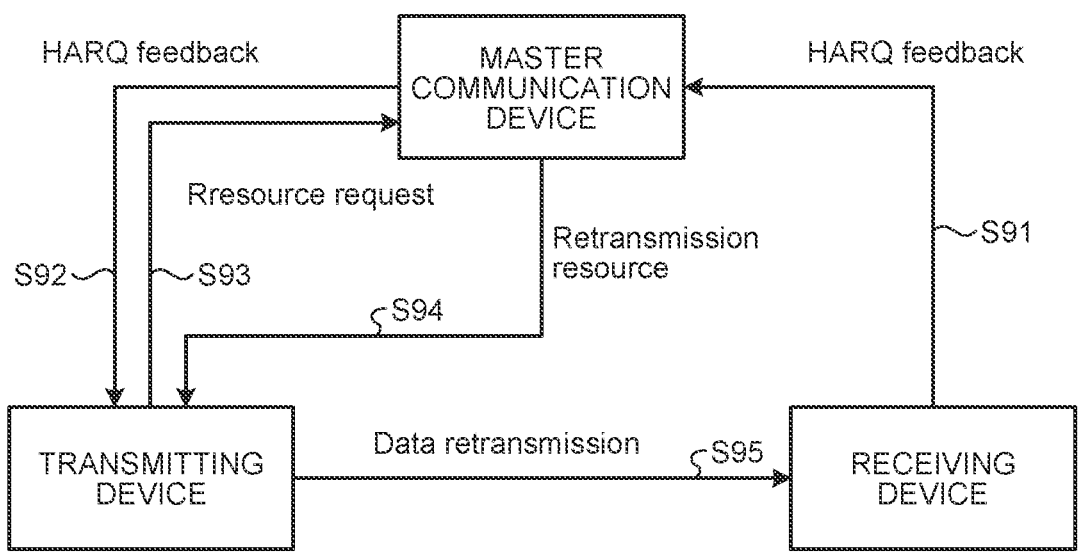
FIG. 32 is a diagram illustrating a data repeat process according to an HARQ feedback mode 9.

FIG. 32 is a diagram illustrating a data repeat process according to the HARQ feedback mode 9. First, the receiving device transmits the HARQ feedback to the master communication device (step S91). Then, the master communication device transmits the HARQ feedback to the transmitting device (step S92). Then, when the HARQ feedback is the NACK, the transmitting device requests a radio resource for data retransmission from the master communication device (step S93). Then, the master communication device allocates the radio resource for data retransmission to the transmitting device (step S94). When the radio resource for data retransmission is allocated, the transmitting device retransmits the data using the allocated radio resource (step S95). Since the HARQ feedback is transmitted via the master communication device, it is possible to reduce the possibility that the HARQ feedback will not reach the transmitting device. Also, since the allocation of radio resources is under the control of the master communication device, the radio resources are not wasted.

4. MODIFICATION

The above-described embodiment illustrates an example, and various modifications and applications are possible.

<4-1. Modification Regarding HARQ Feedback>

For example, in the above embodiment although the automatic repeat request is described as the Hybrid Automatic Repeat reQuest (HARQ), the automatic repeat request is not limited to the HARQ. The automatic repeat request may be another Automatic Repeat reQuest (ARQ) other than the HARQ.

Figure 33:
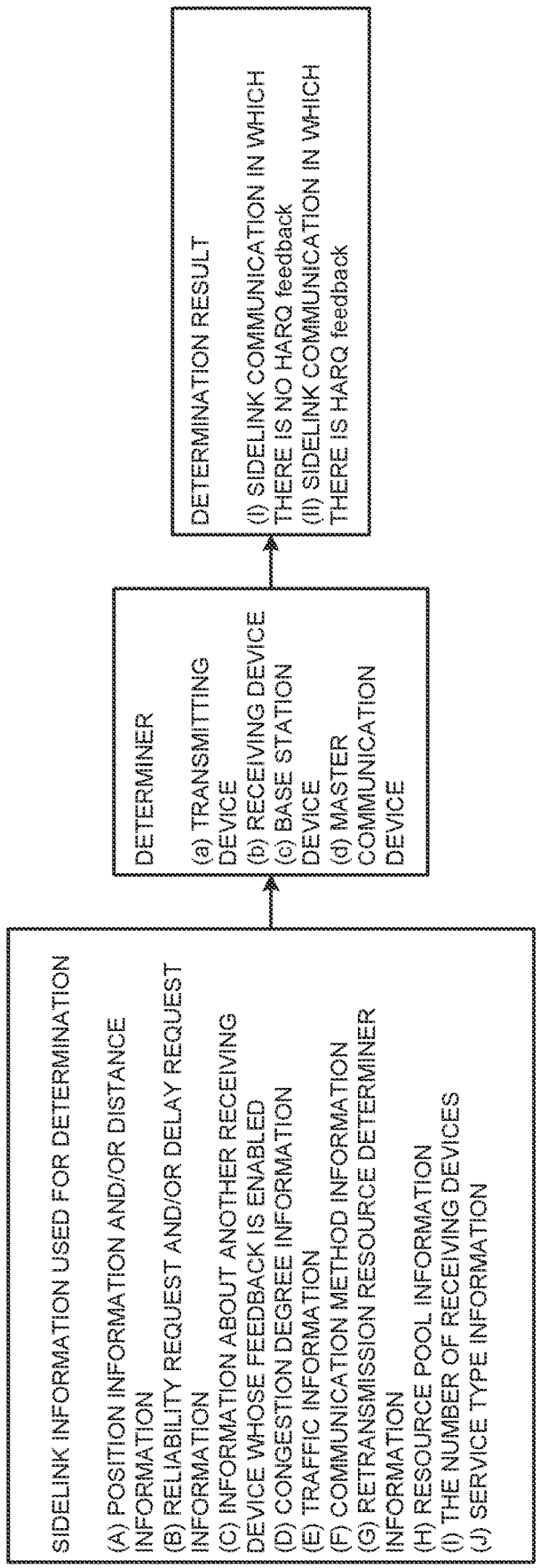
FIG. 33 is a diagram illustrating an example of a combination of sidelink information and a determiner.

In addition, the above-mentioned "sidelink information used for determination (A) to (J)", "determiner (determination entity of enabling/disabling of the HARQ feedback) (a) to (d)", and "HARQ feedback mode 1 to 9" can be combined as appropriate. FIG. 33 is a diagram illustrating an example of a combination of the sidelink information and the determiner.

For example, in the case of the determination entity of enabling/disabling of the HARQ feedback (a), the sidelink information (A), and the HARQ feedback mode 1, the transmitting device determines whether to enable or disable the HARQ feedback based on the positional relationship between itself and the receiving device. Then, the transmitting device notifies the receiver of the determination result.

Also, for example, in the case of the determination entity of enabling/disabling of the HARQ feedback (b), the sidelink information (D), and the HARQ feedback mode 5, the base station device determines whether to enable or disable the HARQ feedback based on the degree of congestion of the channel. Then, when the base station device acquires the NACK as the HARQ feedback from the receiving device, the base station device allocates the radio resource for data retransmission to the transmitting device. The transmitting device retransmits the data by sidelink communication using the allocated radio resource.

Further, the target to which the present embodiment is applied is not limited to the V2X communication. The present embodiment can be applied to use cases other than the V2X communication using sidelink communication. For example, application examples of the present embodiment include D2D communication and MTC communication. The present embodiment can also be applied to the moving cell, the relay communication, and the like.

Further, although the present embodiment is described as a method of the Mode 3 resource allocation, it can be applied to the mode 4.

Further, although the present embodiment is described as a method of the FDM type resource pool, it can be applied to the TDM type resource pool.

The present embodiment can be applied to multi-carrier communication in which the sidelink communication is performed using a plurality of carriers.

<4-2. Other Modifications>

The control device that controls the management device 10, the base station device 20, the base station device 30, the terminal device 40, or the mobile device 50 of the present embodiment may be realized by a dedicated computer system or a general-purpose computer system.

For example, a program for executing the above operation is stored and distributed in a computer-readable recording medium such as an optical disk, a semiconductor memory, a magnetic tape, or a flexible disk. Then, for example, the control device is configured by installing the program on a computer and executing the above-mentioned processing. At this time, the control device may be an external device (for example, a personal computer) of the management device 10, the base station device 20, the base station device 30, the terminal device 40, or the mobile device 50. Further, the control device is a device (for example, the control unit 13, the control unit 24, the control unit 34, the control unit 45, or the control unit 55) inside the management device 10, the base station device 20, the base station device 30, the terminal device 40, or the mobile device 50.

Further, the communication program may be stored in a disk device provided in a server device on a network such as the Internet so that it can be downloaded to a computer or the like. Further, the above-mentioned function may be realized by the operating system (OS) in conjunction with the application software. In this case, the part other than the OS may be stored in a medium and distributed, or the part other than the OS may be stored in the server device so that it can be downloaded to a computer or the like.

Further, in the above embodiment, it is also possible to manually perform all or part of the process described as being performed automatically of respective processes described, alternatively, it is also possible to automatically perform all or part of the process described as being performed manually by a known method. In addition, the processing procedure, specific name, and information including various pieces of data and parameters illustrated in the above document and drawings can be arbitrarily changed unless otherwise specified. For example, the various pieces of information illustrated in each figure is not limited to the illustrated information.

Further, each component of each of the illustrated devices is a functional concept, and does not necessarily have to be physically configured as illustrated in the figure. That is, the specific form of distribution/integration of each device is not limited to the one illustrated in the figure, and all or part of the device can be functionally or physically distributed/integrated in any unit according to various loads and usage conditions.

Further, the above-described embodiments can be appropriately combined in a region where the processing contents do not contradict each other. Further, the order of each step illustrated in the sequence diagram or the flowchart of the present embodiment can be changed as appropriate.

5. CONCLUSION

As explained above according to an embodiment of the present disclosure, the information processing device (for example, the base station device 20 or the mobile device 50) acquires information about sidelink communication (for example, the above-mentioned sidelink information). Then, the information processing device determines whether to enable the HARQ feedback in the sidelink communication based on the information about the sidelink communication. As a result, the HARQ feedback of the communication device of the receiver is enabled or disabled according to the communication aspect, so that high communication performance is achieved in the sidelink communication.

The embodiments of the present disclosure have been described above, the technical scope of the present disclosure is not limited to the above-described embodiments as they are, and various changes can be made without departing from the gist of the present disclosure. Moreover, the components over different embodiments and modifications may be suitably combined.

Further, the effects in each embodiment described in the present specification are merely examples and are not limited, and other effects may be present.

Note that the present technology may also be configured as below.

(1)

An information processing device comprising:
an acquisition unit that acquires information about sidelink communication; and
a determination unit that determines whether to enable feedback related to an automatic repeat request of data in the sidelink communication based on the information about the sidelink communication.

(2)

The information processing device according to (1), wherein
the automatic repeat request includes a plurality of modes with different aspects from the feedback to data retransmission, and
the determination unit determines a mode to be used for the automatic repeat request from the plurality of modes based on the information about the sidelink communication.

(3)

The information processing device according to (1), wherein
the acquisition unit acquires, as information about the sidelink communication, at least one piece of information of distance information indicating a distance between communication devices performing the sidelink communication and position information indicating a position of a communication device performing the sidelink communication, and
the determination unit determines whether to enable the feedback based on the at least one piece of information of the distance information and the position information.

(4)

The information processing device according to (3), wherein
the acquisition unit acquires, as information about the sidelink communication, the distance information indicating the distance between the communication devices that perform the sidelink communication, and
when a distance between the communication devices performing the sidelink communication is larger than a predetermined distance, the determination unit determines to disable the feedback.

(5)

The information processing device according to (3), wherein
a receiving device of the sidelink communication is configured to be able to provide the feedback to a transmitting device via a base station device,
the acquisition unit acquires, as information about the sidelink communication, the position information indicating a position of the receiving device, and
when the receiving device is located outside a coverage of the base station device, the determination unit determines to disable the feedback of the receiving device via the base station device.

(6)
The information processing device according to (1), wherein
the acquisition unit acquires information about a reliability request or a delay request to transmission data of the sidelink communication as information about the sidelink communication, and
the determination unit determines whether to enable the feedback based on the information about the reliability request or the delay request.
(7)
The information processing device according to (1), wherein
the acquisition unit acquires, as information about the sidelink communication, information indicating whether another receiving device the feedback of which is enabled is located within a predetermined range of a first communication device serving as a receiving device for the sidelink communication, and
the determination unit determines whether to enable the feedback of the first communication device based on the information about whether the another receiving device the feedback of which is enabled is located within the predetermined range.
(8)
The information processing device according to (7), wherein
when the another receiving device the feedback of which is enabled is located within the predetermined range, the determination unit determines to disable the feedback of the first communication device, and determines whether to execute data retransmission to the first communication device based on the feedback of the another receiving device.
(9)
The information processing device according to (7), wherein
when the another receiving device the feedback of which is enabled is located within the predetermined range, the determination unit determines to disable the feedback of the first communication device, and determines a data transmission method used for data transmission to the first communication device from a plurality of data transmission methods based on the feedback of the another receiving device.
(10)
The information processing device according to (1), wherein
the acquisition unit acquires, as information about the sidelink communication, information indicating a degree of congestion of a radio resource used for the sidelink communication, and
the determination unit determines whether to enable the feedback based on the information indicating the degree of congestion.
(11)
The information processing device according to (1), wherein
the acquisition unit acquires, as information about the sidelink communication, information about a traffic of the sidelink communication, and
the determination unit determines whether to enable the feedback based on the information about the traffic.
(12)
The information processing device according to (1), wherein
the acquisition unit acquires, as information about the sidelink communication, information for identifying which of a plurality of communication methods including at least one of a broadcast, a multicast, and a unicast a communication method used for the sidelink communication is, and
the determination unit determines whether to enable the feedback based on the information for identifying the communication method of the sidelink communication.
(13)
The information processing device according to (12), wherein
the acquisition unit acquires, as information about the sidelink communication, information for identifying which of the plurality of communication methods including at least a broadcast a communication method used for the sidelink communication is, and
when a communication method used for the sidelink communication is a broadcast, the determination unit determines to disable the feedback.
(14)
The information processing device according to (12), wherein
the acquisition unit acquires, as information about the sidelink communication, information for identifying which of a plurality of communication methods including at least a multicast a communication method used for the sidelink communication is, and
when a communication method used for the sidelink communication is a multicast, the determination unit determines to enable the feedback.
(15)
The information processing device according to (12), wherein
the acquisition unit acquires, as information about the sidelink communication, information for identifying which of the plurality of communication methods including at least a unicast a communication method used for the sidelink communication is, and
when a communication method used for the sidelink communication is a unicast, the determination unit determines to enable the feedback.
(16)
The information processing device according to (1), wherein
the acquisition unit acquires, as information about the sidelink communication, information for identifying which device a device that determines a radio resource for data retransmission is, and
the determination unit determines whether to enable the feedback based on the information for identifying a device that determines the radio resource for data retransmission.
(17)
The information processing device according to (16), wherein
when a device that determines the radio resource for data retransmission is a base station device, the determination unit determines to disable the direct feedback from a receiving device to a transmitting device of the sidelink communication, and determines to enable feedback from the receiving device to the base station device.
(18)
The information processing device according to (16), wherein
in a case where a device that determines the radio resource for data retransmission is a master communication device that controls the sidelink communication between slave communication devices via sidelink communication, the determination unit determines to disable the direct feedback from a receiving device to a transmitting device of the sidelink communication, and determines to enable feedback from the receiving device to the master communication device.

(19)
The information processing device according to (1), wherein
the acquisition unit acquires, as information about the sidelink communication, information about a resource pool of a radio resource used for the sidelink communication, and
the determination unit determines whether to enable the feedback based on the information about the resource pool.

(20)
The information processing device according to (1), wherein
the acquisition unit acquires, as information about the sidelink communication, information indicating the number of receiving devices of the sidelink communication, and
the determination unit determines whether to enable the feedback based on the information indicating the number of the receiving devices.

(21)
The information processing device according to (20), wherein
when the number of receiving devices is more than a predetermined number, the determination unit determines to disable the feedback.

(22)
The information processing device according to (20) or (21), wherein
when the number of receiving devices is less than a predetermined number, the determination unit determines to enable the feedback.

(23)
The information processing device according to (1), wherein
the acquisition unit acquires, as information about the sidelink communication, information indicating a type of communication service performed using the sidelink communication, and
the determination unit determines whether to enable the feedback based on the information indicating the type of the communication service.

(24)
The information processing device according to (23), wherein
when a type of the communication service executed by using the sidelink communication is ultra-reliable and low latency communications (URLLC), the determination unit determines to disable the feedback.

(25)
The information processing device according to any one of (1) to (24), wherein
the automatic repeat request includes a plurality of modes in which at least one of the feedback path and a device that determines a radio resource for data retransmission is different, and
the determination unit determines a mode to be used for the automatic repeat request from a plurality of modes based on the information about the sidelink communication.

(26)
The information processing device according to (25), wherein
the plurality of modes includes at least a first mode in which the feedback is transmitted from a receiving device to a transmitting device of the sidelink communication via the sidelink communication.

(27)
The information processing device according to (25) or (26), wherein
the plurality of modes includes at least a second mode in which the feedback is transmitted from a receiving device to a transmitting device of the sidelink communication via a base station device that is radio connected to a transmitting device or a receiving device of the sidelink communication.

(28)
The information processing device according to any one of (25) to (27), wherein
the plurality of modes includes at least a third mode in which the feedback is transmitted from a receiving device to a transmitting device of the sidelink communication via a master communication device that controls the sidelink communication between slave communication devices via sidelink communication.

(29)
The information processing device according to any one of (25) to (28), wherein
the plurality of modes includes at least a fourth mode in which a transmitting device of the sidelink communication determines a resource for data retransmission by itself.

(30)
The information processing device according to any one of (25) to (29), wherein
the plurality of modes includes at least a fifth mode in which a base station device that is radio connected to a transmitting device of the sidelink communication to determine a resource for data retransmission to the transmitting device.

(31)
The information processing device according to any one of (25) to (30), wherein
the plurality of modes includes at least a sixth mode in which a master communication device that controls the sidelink communication between slave communication devices via sidelink communication determines a resource for data retransmission to a transmitting device of the sidelink communication.

(32)
The information processing device according to any one of (1) to (31), wherein
the information processing device is a communication device capable of executing the sidelink communication, and
includes a notification unit that notifies one or a plurality of communication devices serving as corresponding devices in the sidelink communication of a determination result of the determination unit.

(33)
The information processing device according to any one of (1) to (31), wherein
the information processing device is a base station device capable of radio communicating with a plurality of communication devices that executes the sidelink communication, and
includes a notification unit that notifies one or a plurality of devices of the plurality of the communication devices that performs the sidelink communication of a determination result of the determination unit.

(34)
The information processing device according to any one of (1) to (31), wherein
the information processing device is a master communication device that controls the sidelink communication between slave communication devices via sidelink communication, and includes a notification unit that notifies one or a plurality of devices of the slave communication devices that perform the sidelink communication of a determination result of the determination unit.

(35)

The information processing device according to any one of (1) to (34), wherein the feedback is HARQ (Hybrid Automatic Repeat reQuest) feedback.

(36)

An information processing method comprising:

acquiring information about sidelink communication; and determining whether to enable feedback related to an automatic repeat request of data in the sidelink communication based on the information about the sidelink communication.

(37)

An information processing program causing a computer to function as an acquisition unit that acquires information about sidelink communication, and a determination unit that determines whether to enable feedback related to an automatic repeat request of data in the sidelink communication based on the information about the sidelink communication.

(38)

A communication device comprising:

an acquisition unit that acquires information about sidelink communication, and that acquires, from an information processing device that determines whether to enable feedback related to an automatic repeat request of data in the sidelink communication based on the information about the sidelink communication, information indicating a result of the determination; and a communication control unit that executes the feedback when data is received via the sidelink communication in a case where the result of the determination is information indicating the feedback is enabled, and does not execute the feedback when data is received via the sidelink communication in a case where the result of the determination is information indicating the feedback is enabled.

(39)

A communication method including acquiring information about sidelink communication, and acquiring, from an information processing device that determines whether to enable feedback related to an automatic repeat request of data in the sidelink communication based on the information about the sidelink communication, information indicating a result of the determination, and executing the feedback when data is received via the sidelink communication in a case where the result of the determination is information indicating the feedback is enabled, and not executing the feedback when data is received via the sidelink communication in a case where the result of the determination is information indicating the feedback is enabled.

(40)

A communication program causing a computer to function as an acquisition unit that acquires information about sidelink communication, and that acquires, from an information processing device that determines whether to enable feedback related to an automatic repeat request of data in the sidelink communication based on the information about the sidelink communication, information indicating a result of the determination, and a communication control unit that executes the feedback when data is received via the sidelink communication in a case where the result of the determination is information indicating the feedback is enabled, and does not execute the feedback when data is received via the sidelink communication in a case where the result of the determination is information indicating the feedback is enabled.

REFERENCE SIGNS LIST

1 INFORMATION PROCESSING SYSTEM
10 MANAGEMENT DEVICE
20, 30 BASE STATION DEVICE
40 TERMINAL DEVICE
50 MOBILE DEVICE
11, 23, 33, 43, 53 NETWORK COMMUNICATION UNIT
12, 22, 32, 42, 52 STORAGE UNIT
13, 24, 34, 45, 55 CONTROL UNIT
21, 31, 41, 51 RADIO COMMUNICATION UNIT
44, 54 INPUT/OUTPUT UNIT
211, 311, 411, 511 RECEPTION PROCESSING UNIT
212, 312, 412, 512 TRANSMISSION PROCESSING UNIT
213, 313, 413, 513 ANTENNA
241, 341, 451, 551 ACQUISITION UNIT
242, 342, 452, 552 DETERMINATION UNIT
243, 343, 453, 553 NOTIFICATION UNIT
244, 344, 454, 554 COMMUNICATION CONTROL UNIT

The invention claimed is:

1. A first user equipment, comprising:
a radio transceiver; and
circuitry configured to:
  acquire sidelink information that includes information indicating a communication method of sidelink communication selected from amongst broadcast, groupcast, and unicast;
  determine, based on the acquired sidelink information, whether to enable or disable feedback related to Hybrid Automatic Repeat reQuest (HARQ) for the sidelink communication;
  control the radio transceiver to transmit a first determination result on a Physical Sidelink Shared Channel (PSSCH) in a case where the feedback for the sidelink communication is determined to be enabled, wherein
    the first determination result indicates that the feedback for the sidelink communication is enabled;
  control the radio transceiver to transmit a second determination result on the PSSCH in a case where the feedback for the sidelink communication is determined to be disabled, wherein
    the second determination result indicates that the feedback for the sidelink communication is disabled; and
  classify, in a case where the acquired sidelink information indicates the groupcast, a plurality of second user equipments that receives the sidelink communication to a first group for which the feedback is enabled and to a second group for which the feedback is disabled.

2. The first user equipment according to claim 1, wherein the HARQ includes a plurality of modes with different aspects from the feedback to data retransmission, and the circuitry is further configured to determine a mode for the HARQ from the plurality of modes, based on the acquired sidelink information.

3. The first user equipment according to claim 1, wherein the circuitry is further configured to:
acquire, as the sidelink information about the sidelink communication, at least one piece of information of distance information indicating a distance between communication devices that perform the sidelink communication and position information indicating a position of a communication device that performs the sidelink communication, and
determine whether to enable or disable the feedback based on the at least one piece of information of the distance information and the position information.

4. The first user equipment according to claim 1, wherein the circuitry is further configured to:
acquire information about a reliability request or a delay request to transmission data of the sidelink communication, as the sidelink information about the sidelink communication, and
determine whether to enable or disable the feedback based on the information about the reliability request or the delay request.

5. The first user equipment according to claim 1, wherein the circuitry is further configured to:
acquire, as the sidelink information about the sidelink communication, information indicating whether a first communication device for which the feedback is enabled is located within a specific range of a second communication device that serves as a receiving device for the sidelink communication,
the plurality of second user equipments includes the first communication device and the second communication device, and
determine whether to enable or disable the feedback of the first communication device based on the information about whether the second communication device is located within the specific range.

6. The first user equipment according to claim 5, wherein, in a case where the second communication device is located within the specific range, the circuitry is further configured to:
determine to disable the feedback of the first communication device, and
determine whether to execute data retransmission to the first communication device based on the feedback of the second communication device.

7. The first user equipment according to claim 5, wherein, in a case where the second communication device is located within the specific range, the circuitry is further configured to:
determine to disable the feedback of the first communication device, and
determine, based on the feedback of the second communication device, a data transmission method from a plurality of data transmission methods for data transmission to the first communication device.

8. The first user equipment according to claim 1, wherein the circuitry is further configured to:
acquire, as the sidelink information about the sidelink communication, information indicating a degree of congestion of a radio resource used for the sidelink communication, and
determine whether to enable or disable the feedback based on the information indicating the degree of congestion.

9. The first user equipment according to claim 1, wherein the circuitry is further configured to:
acquire, as the sidelink information about the sidelink communication, information about a traffic of the sidelink communication, and
determine whether to enable or disable the feedback based on the information about the traffic.

10. The first user equipment according to claim 1, wherein the circuitry is further configured to:
acquire, as the sidelink information about the sidelink communication, information for identification of a device that determines a radio resource for data retransmission, and
determine whether to enable or disable the feedback based on the information for the identification of the device that determines the radio resource for the data retransmission.

11. The first user equipment according to claim 1, wherein the circuitry is further configured to:
acquire, as the sidelink information about the sidelink communication, information about a resource pool of a radio resource used for the sidelink communication, and
determine whether to enable or disable the feedback based on the information about the resource pool.

12. The first user equipment according to claim 1, wherein the circuitry is further configured to:
acquire, as the sidelink information about the sidelink communication, information indicating a number of the plurality of second user equipments of the sidelink communication, and
determine whether to enable the feedback based on the information indicating the number of the plurality of second user equipments.

13. The first user equipment according to claim 1, wherein the circuitry is further configured to:
acquire, as the sidelink information about the sidelink communication, information indicating a type of communication service performed using the sidelink communication, and
determine whether to enable or disable the feedback based on the information indicating the type of the communication service.

14. The first user equipment according to claim 1, wherein the first user equipment is a communication device that executes the sidelink communication, and
the first user equipment is further configured to notify the plurality of second user equipments that serves as corresponding devices in the sidelink communication.

15. The first user equipment according to claim 1, wherein the first user equipment is a base station device that radio communicates with the plurality of second user equipments that executes the sidelink communication, and
the first user equipment is further configured to notify the first determination result or the second determination result to at least one of the plurality of the second user equipments that performs the sidelink communication.

16. The first user equipment according to claim 1, wherein the first user equipment is a master communication device that controls the sidelink communication between slave communication devices via the sidelink communication, and
the first user equipment is further configured to notify the first determination result or the second determination result to at least one of the slave communication devices that perform the sidelink communication.

17. The first user equipment according to claim 1, wherein the circuitry is further configured to:
- control the radio transceiver to transmit data on the sidelink communication; and
- control the radio transceiver to receive an acknowledgement (ACK) or a non-acknowledgement (NACK) for the transmitted data in a case where the feedback is enabled, wherein
  - the ACK and NACK is not received in a case where the feedback is disabled.

18. The first user equipment according to claim 17, wherein the circuitry is further configured to control the radio transceiver to re-transmit the data on the sidelink communication in a case where the feedback is enabled and the NACK is received.

19. A method, comprising:
- acquiring sidelink information that includes information indicating a communication method of sidelink communication selected from amongst broadcast, groupcast, and unicast;
- determining, based on the acquired sidelink information, whether to enable or disable feedback related to Hybrid Automatic Repeat reQuest (HARQ) for the sidelink communication;
- transmitting a first determination result on a Physical Sidelink Shared Channel (PSSCH) in a case where the feedback for the sidelink communication is determined to be enabled, wherein
  - the first determination result indicates that the feedback for the sidelink communication is enabled;
- transmitting a second determination result on the PSSCH in a case where the feedback for the sidelink communication is determined to be disabled, wherein
  - the second determination result indicates that the feedback for the sidelink communication is disabled; and
- classifying, in a case where the acquired sidelink information indicates the groupcast, a plurality of second user equipments that receives the sidelink communication to a first group for which the feedback is enabled and to a second group for which the feedback is disabled.

20. The method according to claim 19, further comprising:
- transmitting data on the sidelink communication; and
- receiving an acknowledgement (ACK) or a non-acknowledgement (NACK) for the transmitted data in a case where the feedback is enabled, wherein
  - the ACK and NACK is not received in a case where the feedback is disabled.

21. The method according to claim 20, further comprising:
- re-transmitting the data on the sidelink communication in a case where the feedback is enabled and the NACK is received.

* * * * *